United States Patent
Freitas et al.

(10) Patent No.: US 11,906,076 B2
(45) Date of Patent: Feb. 20, 2024

(54) BALL CONTROL VALVES HAVING THREE-DIMENSIONAL TORTUOUS PATH FLOWPATHS

(71) Applicant: Control Components, Inc., Rancho Santa Margarita, CA (US)

(72) Inventors: Stephen Freitas, Rancho Santa Margarita, CA (US); Ruben Mendoza, Rancho Santa Margarita, CA (US); Daniel A. Watson, Rancho Santa Margarita, CA (US); Shane Gillette, Rancho Santa Margarita, CA (US); Raymond R. Newton, Rancho Santa Margarita, CA (US); Robert Taylor, Birmingham (GB); Tom Morton, Birmingham (GB)

(73) Assignee: CONTROL COMPONENTS, INC., Rancho Santa Margarita, CA (US)

( * ) Notice: Subject to any disclaimer, the term of this patent is extended or adjusted under 35 U.S.C. 154(b) by 0 days.

(21) Appl. No.: 17/731,800

(22) Filed: Apr. 28, 2022

(65) Prior Publication Data
US 2022/0356951 A1 Nov. 10, 2022

Related U.S. Application Data

(60) Provisional application No. 63/185,813, filed on May 7, 2021.

(51) Int. Cl.
*F16K 47/04* (2006.01)
*F16K 1/22* (2006.01)
(Continued)

(52) U.S. Cl.
CPC ............... *F16K 5/06* (2013.01); *F16K 1/22* (2013.01); *F16K 5/20* (2013.01); *F16K 47/04* (2013.01)

(58) Field of Classification Search
CPC ..... F16K 5/12; F16K 5/10; F16K 5/20; F16K 1/222; F16K 5/0605; F16K 47/045; F16K 5/06; F16K 1/52; F16K 1/54
See application file for complete search history.

(56) References Cited

U.S. PATENT DOCUMENTS 4,212,321 A * 7/1980 Hulsey .................. F16K 47/045
251/127
4,295,493 A 10/1981 Bey
(Continued)

FOREIGN PATENT DOCUMENTS

DE 3017857 A1 * 11/1981
EP 325846 A * 8/1989 ........... F16K 47/045
(Continued)

OTHER PUBLICATIONS

Mogus Industries, Inc. "Severe Service Control Valve Solutions," 28 pages. 2016.
(Continued)

*Primary Examiner* — Marina A Tietjen
(74) *Attorney, Agent, or Firm* — Stetina Brunda Garred & Brucker

(57) ABSTRACT

A valve body, for use in a valve housing having an inlet and outlet, includes a spherical outer surface. A flow opening extends diametrically from one side of the outer surface to an opposing side. A plurality of flow control passageways extend from the outer surface into the valve body. The valve body is moveable relative to the valve housing between a closed position, a restricted flow position, and a free flow position. In the closed position, the flow opening and all of the plurality of flow control passageways are out of alignment with the inlet and outlet. In the restricted flow position, at least one flow control passageway is moved into fluid communication with the inlet and outlet to facilitate fluid communication therebetween. In the free flow position, the
(Continued)

flow opening is moved into fluid communication with the inlet and outlet to facilitate fluid communication therebetween.

21 Claims, 14 Drawing Sheets

(51) Int. Cl.
*F16K 5/06* (2006.01)
*F16K 5/20* (2006.01)

(56) References Cited

U.S. PATENT DOCUMENTS

| | | | |
|---|---|---|---|
| RE31,105 E | | 12/1982 | Bates, Jr. |
| 5,070,909 A | * | 12/1991 | Davenport ............ F16K 5/0605 251/315.08 |
| 5,113,909 A | | 5/1992 | Marin et al. |
| 5,218,984 A | | 6/1993 | Allen |
| 5,332,004 A | | 7/1994 | Gethmann et al. |
| 5,400,825 A | * | 3/1995 | Gethmann ............ F16K 5/0605 251/127 |
| 5,509,446 A | * | 4/1996 | Bey ........................ F16K 5/12 251/127 |
| 5,511,584 A | * | 4/1996 | Leinen ................. F16K 5/0605 137/625.3 |
| 5,524,863 A | * | 6/1996 | Davis ........................ B08B 9/00 251/127 |
| 5,680,889 A | | 10/1997 | Boger |
| 5,771,929 A | | 6/1998 | Boger |
| 5,890,505 A | | 4/1999 | Boger |
| 5,937,901 A | | 8/1999 | Bey |
| 6,974,116 B1 | * | 12/2005 | Christenson .......... F16K 47/045 138/43 |
| 7,178,782 B1 | | 2/2007 | York |
| 9,528,632 B2 | | 12/2016 | Glaun |
| 2004/0020541 A1 | * | 2/2004 | Tran ...................... F16K 47/045 137/625.3 |
| 2010/0163774 A1 | | 1/2010 | Etinger |
| 2010/0258193 A1 | | 10/2010 | Christenson et al. |
| 2018/0283579 A1 | * | 10/2018 | Morein ................ F16K 11/0873 |
| 2019/0107227 A1 | * | 4/2019 | Kuitunen ............... F16K 5/0605 |
| 2022/0356951 A1 | * | 11/2022 | Freitas .................. F16K 47/045 |

FOREIGN PATENT DOCUMENTS

| | | | | |
|---|---|---|---|---|
| EP | 838617 A1 | * | 4/1998 | ........... F16K 47/045 |
| EP | 1890065 A2 | * | 2/2008 | ........... F16K 47/045 |
| FR | 2506420 A | * | 11/1982 | ........... F16K 47/045 |
| WO | WO-9401703 A1 | * | 1/1994 | ............... F16K 5/12 |

OTHER PUBLICATIONS

International Search Report for PCT/US2021/012279; dated Mar. 9, 2021.
Hyper Cageball Trim Concept (PDF Brochure).
International Search Report and Written Opinion for PCT/US2022/027326; dated Aug. 3, 2022.
Taiwanese Office Action dated Jun. 28, 2023.

* cited by examiner

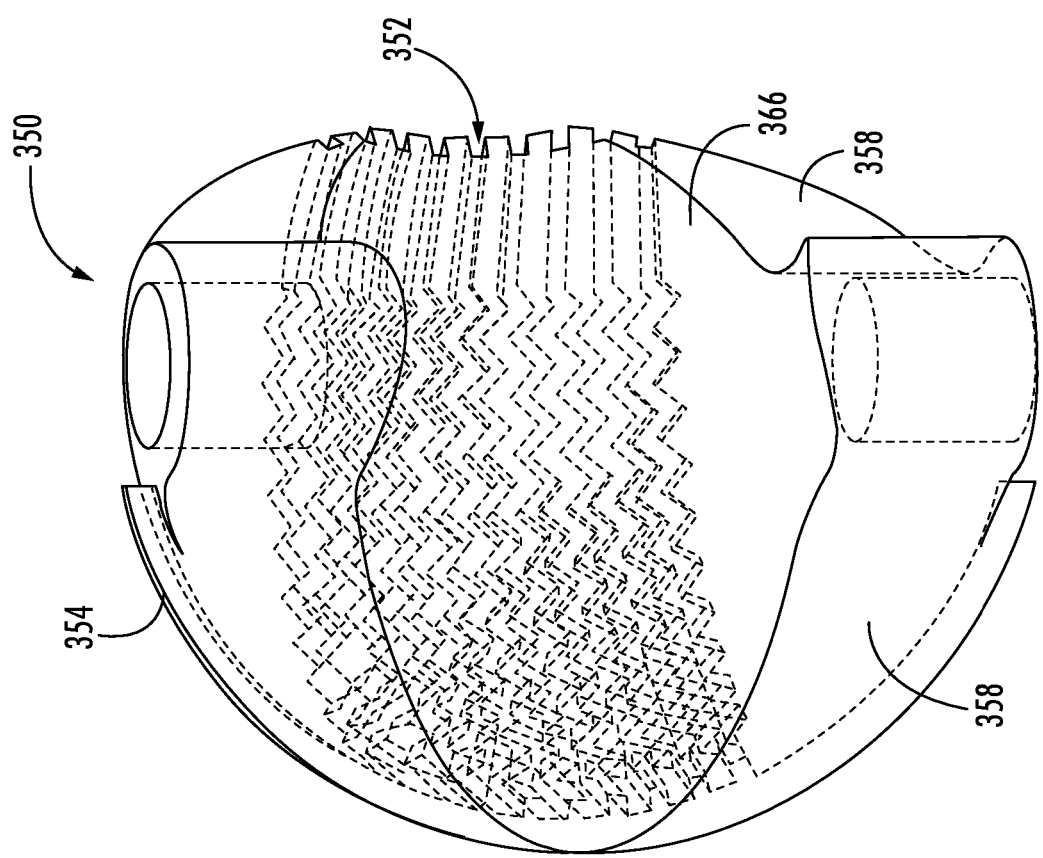
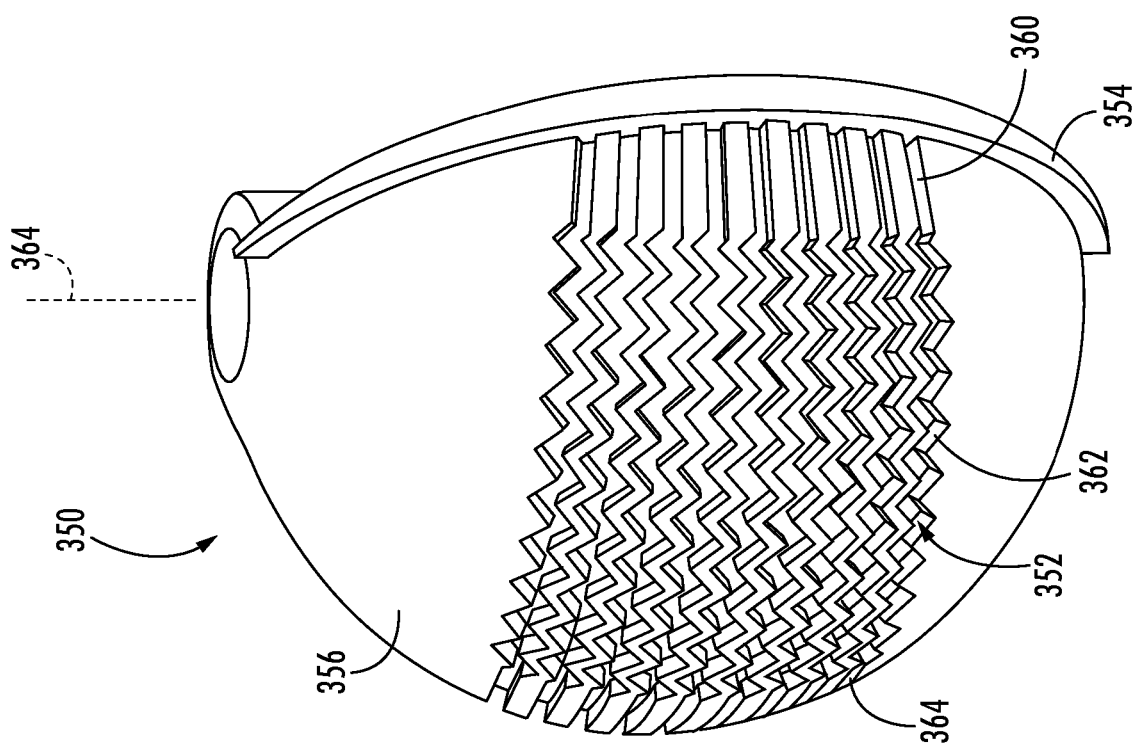

BALL CONTROL VALVES HAVING THREE-DIMENSIONAL TORTUOUS PATH FLOWPATHS

CROSS-REFERENCE TO RELATED APPLICATIONS

The present application claims priority to U.S. Provisional Application Ser. No. 63/185,813 filed May 7, 2021, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a flow control element, and more specifically to a ball-type flow control element having a plurality of integrated flow control passageways therein.

2. Description of the Related Art

Linear fluid control valve assemblies are known and are commonly outfitted to include a noise attenuation or impedance assembly. Such valves are often referred to in the relevant industry as drag valves. Prior art linear valves may include an annular impedance assembly which includes a plurality of annular disks, each defining a plurality of radially extending, tortuous flow passages, with the disks being secured to each other in a stacked arrangement. A piston may be disposed within the interior of the impedance assembly and may be cooperatively engaged to an actuator operative to facilitate the reciprocal movement of the piston within the impedance assembly. When the piston is in a lowermost position, none of the passages of the impedance assembly may be exposed to an incoming flow. However, as the piston is moved upwardly toward an open position, flow passes through the passages of the impedance assembly to provide an exit flow through the linear valve. The amount of flow through the impedance assembly may be varied by the position of the piston, which in turn varies the area or proportion of the impedance assembly exposed to the incoming flow within the interior thereof.

Though the above-described linear valve arrangement provides significant noise reduction capabilities, in certain applications it is often desirable to employ the use of a rotary valve utilizing a rotary closure element as an alternative to a linear valve.

Accordingly, there is a need in the art for a flow control element that can achieve desired flow characteristics in a rotary valve utilizing a rotary closure element. Various aspects of the present disclosure address this particular need, as will be discussed in more detail below.

BRIEF SUMMARY

According to one embodiment of the present disclosure, there is provided a valve body for use in a valve housing having a fluid inlet and a fluid outlet. The valve body includes an outer surface that is of a spherical configuration. A flow opening extends diametrically from one side of the outer surface to an opposing side of the outer surface. The valve body additionally includes a plurality of flow control passageways, with each flow control passageway having an outer surface opening at the outer surface. The valve body is moveable relative to the valve housing between a closed position, a restricted flow position, and a free flow position. In the closed position, the flow opening and all of the plurality of flow control passageways are out of alignment with both the fluid inlet and the fluid outlet to prevent fluid flow therebetween. In the restricted flow position, at least one of the plurality of flow control passageways is moved into fluid communication with the fluid inlet and the fluid outlet to facilitate fluid communication therebetween. In the free flow position, the flow opening is moved into fluid communication with the fluid inlet and the fluid outlet to facilitate fluid communication therebetween.

At least a portion, or the entirety, of the valve body may be formed via three-dimensional printing.

Each of the plurality of flow control passageways may be in fluid communication with the flow opening. Alternatively, each of the plurality of flow control passageways may be fluidly isolated from the flow opening. The valve body may also include a plenum fluidly connecting a pair of the plurality of flow control passageways.

The valve body may be configured to transition from the closed position, to the restricted flow position, and to the free flow position via rotation of the valve body relative to the valve housing by a magnitude of 90 degrees or less.

Each outer surface opening may be of a similar configuration. Alternatively, at least one outer surface opening may be of a first configuration and at least one outer surface opening may be of a second configuration different from the first configuration.

The outer surface openings may be arranged in a plurality of arrays.

The valve body may be rotatable about a rotation axis between the closed position, the restricted flow position, and the free flow position, with the flow opening extending along a flow opening axis generally perpendicular to the rotation axis.

According to another embodiment, the valve body includes an outer surface that is of a spherical configuration. The outer surface includes a closed region, a pair of restricted regions and a pair of free flow regions. The closed region includes a continuous surface without any openings formed therein, each restricted region includes a plurality of passageway openings each being in communication with an internal passageway, and each free flow region is in communication with a common free flow opening. The valve body is moveable relative to the valve housing between a closed position, a restricted flow position, and a free flow position. In the closed position, the closed region is in alignment with at least the fluid inlet, and the pair of restricted regions and the pair of free flow regions are out of alignment with the fluid inlet to prevent fluid flow between the fluid inlet and the fluid outlet. In the restricted flow position, at least a portion of each of the plurality of restricted regions is moved into fluid communication with the fluid inlet and the fluid outlet to facilitate fluid communication therebetween. In the free flow position, the pair of free flow regions are moved into fluid communication with the fluid inlet and the fluid outlet to facilitate fluid communication therebetween.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 20 is a rear, upper perspective view of the inner restricting core of FIG. 18;

FIG. 21 is a front, upper perspective view of the inner restricting core of FIG. 18;

Common reference numerals are used throughout the drawings and the detailed description to indicate the same elements.

DETAILED DESCRIPTION

The detailed description set forth below in connection with the appended drawings is intended as a description of certain embodiments of a flow control valve and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to FIGS. 1-4, there is depicted a first embodiment of a ball-type valve body 10 adapted for use in a valve housing having a fluid inlet, a fluid outlet, and an internal flow path extending therebetween. The valve body 10 includes a plurality of flow control passageways 12 formed therein and positioned on the valve body 10 such that the flow control passageways 12 may be moved incrementally into fluid alignment with the fluid inlet and fluid outlet of the valve housing as the valve body 10 transitions from a closed position to an open position. The valve body 10 may additionally include an unrestricted flow opening 14, separate from the flow control passageways 12, which may be aligned with the fluid inlet and the fluid outlet when the valve body 10 is moved into a fully open position. The configuration of the valve body 10 may be designed to control or regulate the fluid pressure/velocity when the valve body 10 opens. Oftentimes, the pressure/velocity of the fluid at the initial movement of the valve body 10 from the closed position toward the open position is of greater magnitude (and greater concern), than the pressure/velocity of the fluid when the valve body 10 is completely open. Thus, the flow control passageways 12 may be configured and arranged to provide a greater degree of energy attenuation immediately at the opening of the valve body 10, with those energy attenuating attributes decreasing as the valve body 10 continues to transition to its fully open position, eventually culminating in at least a portion of the valve body 10 providing virtually no flow restriction when the valve body 10 is completely open.

Figure 1:
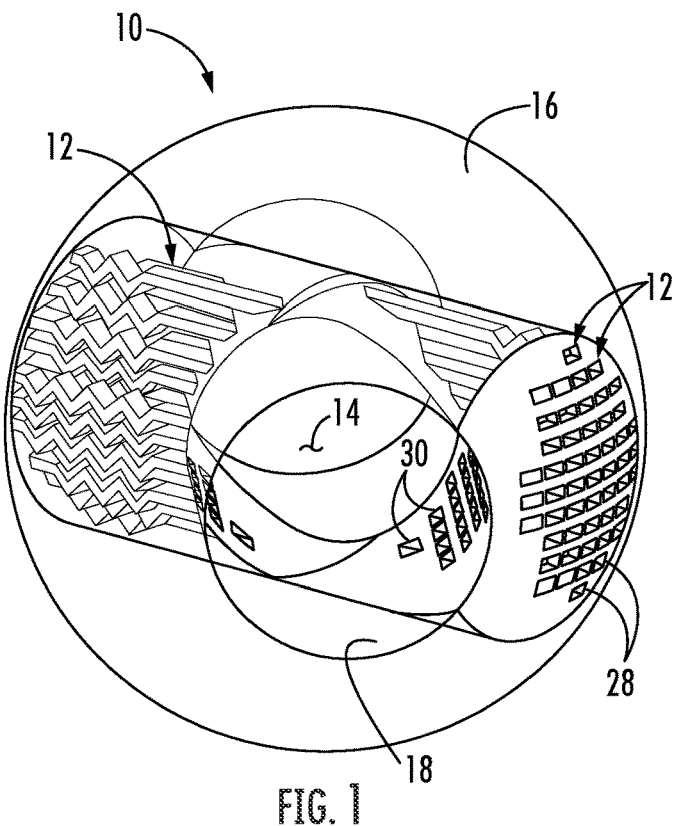
FIG. 1 is an upper perspective view of a first embodiment of a fluid energy dissipating valve body for integration into a flow control valve.
Figure 2:
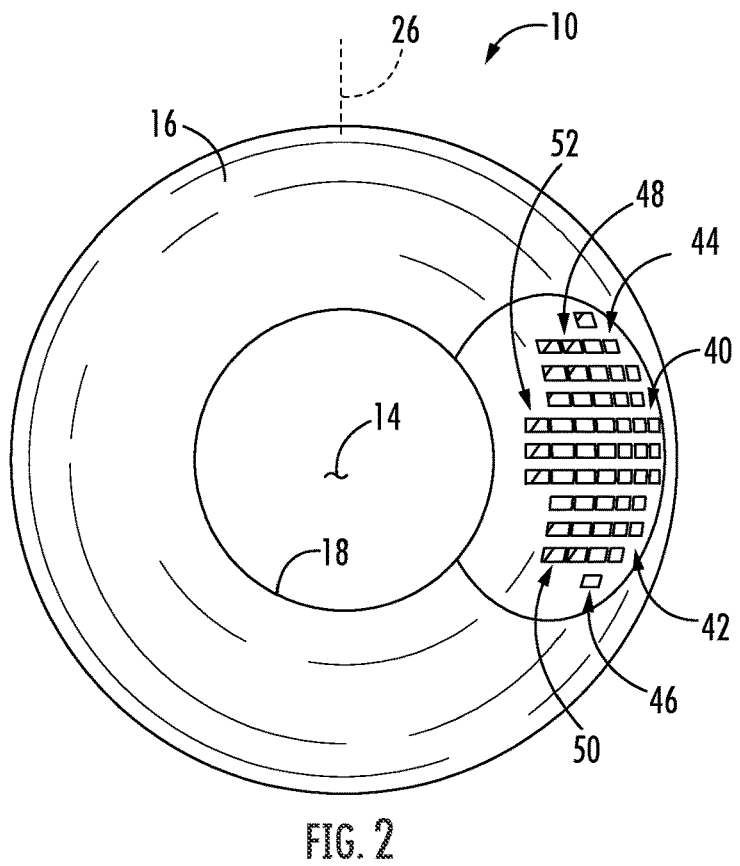
FIG. 2 is a front view of the valve body depicted in FIG. 1.
Figure 3:
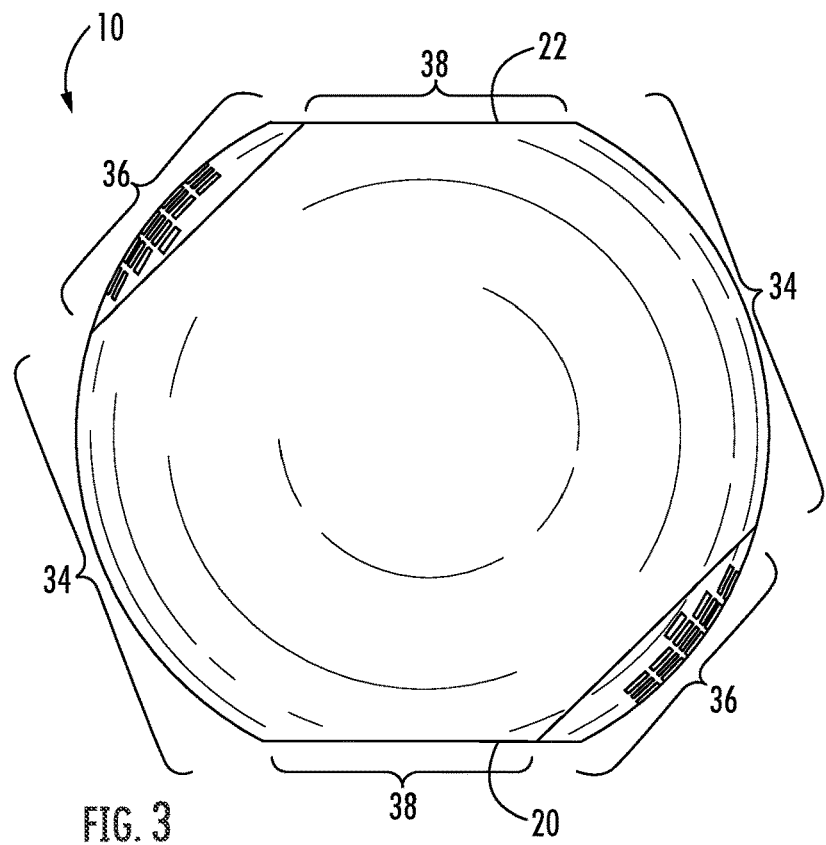
FIG. 3 is a top view of the valve body depicted in FIG. 1.
Figure 4:
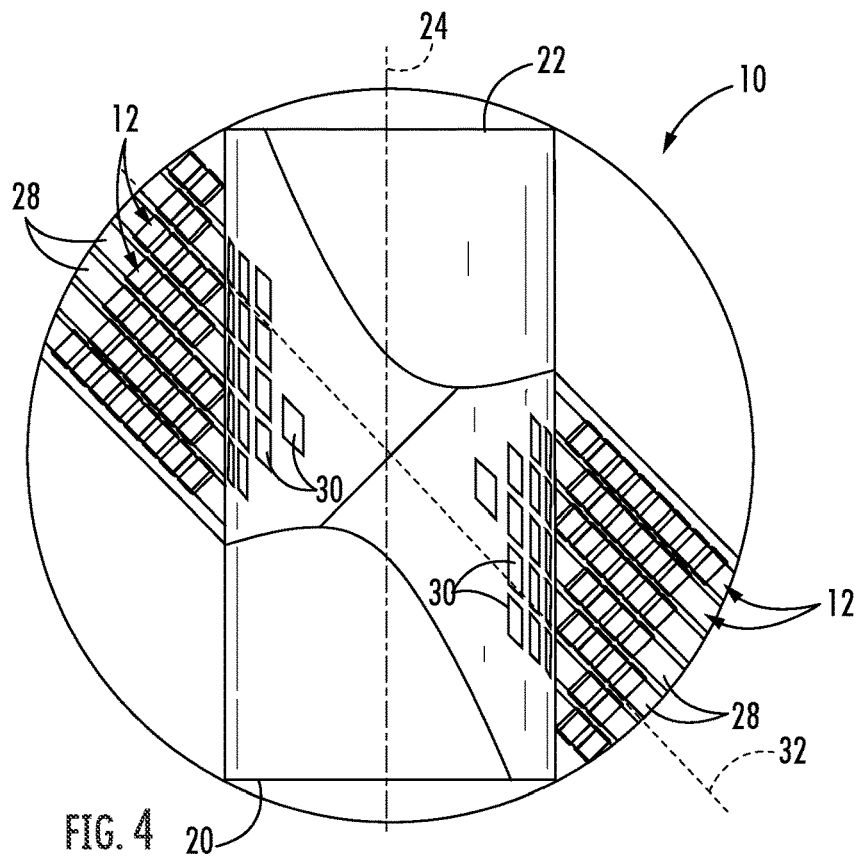
FIG. 4 is a top, cross sectional view of the valve body depicted in FIG. 1.

FIG. 1 is an upper perspective view of the valve body 10, with FIG. 2 being a front view of the valve body 10 and FIG. 3 being a top view of the valve body 10. FIG. 4 is a top, cross sectional view, essentially viewing the valve body 10 from the same perspective as FIG. 3, with the upper half of the valve body 10 having been removed to expose the flow control passageways 12 as well as the flow opening 14. An outer portion of the valve body 10 depicted in FIG. 1 is transparent, solely for purposes of illustration, to show the configuration of the flow control passageways 12 that extend within the valve body 10.

The valve body 10 includes an outer surface 16 that is generally spherical in configuration. A cylindrical inner surface 18 extends diametrically through the valve body 10 and defines the flow opening 14, which includes an inlet port 20 and an outlet port 22. The inlet port 20 refers to the portion of the flow opening 14 that receives fluid directly from the fluid inlet, and the outlet port 22 refers to the portion of the flow opening 14 that delivers fluid directly to the fluid outlet. Although the inlet and outlet ports 20, 22 have been labeled in FIGS. 3 and 4, it is contemplated that the valve body 10 may be configured such that either one of the ports 20, 22 may serve as the inlet, while the other one of the ports 20, 22 may serve as the outlet. In other words, it is contemplated that the valve body 10, and the valve into which it is integrated, may accommodate bi-directional flow.

The flow opening 14 extends along a free flow axis 24 and the valve body 10 may be configured to be rotatable within the valve housing between the closed and open positions about a rotation axis 26 that is generally perpendicular to the free flow axis 24.

Each flow control passageway 12 includes an outer surface opening 28 at the outer surface 16 and an inner surface opening 30 at the inner surface 30, with the inner surface opening 30 facilitating fluid communication between the flow control passageway 12 and the flow opening 14. The flow control passageways 12 may extend generally parallel to a restricted flow axis 32 between their respective outer surface opening 28 and inner surface opening 30. The flow control passageways 12 are designed to impart a pressure drop on the fluid flowing therethrough. Accordingly, each flow control passageway 12 may include a series of bends or turns to define a tortuous configuration. The series of bends or turns may define one or more stages in the passageway 12, with adjacent stages being separated by a turn or bend. In any given passageway 12, increasing the number of stages allows for a larger pressure drop to be achieved by the fluid flowing through the passageway 12. The number of stages in any given passageway 12 may be dependent on the length of the passageway 12, which may refer to the distance along the passageway 12 between the outer surface opening 28 and the inner surface opening 30. A longer passageway 12 may thus include more stages than a shorter passageway 12.

From the perspective shown in FIG. 3, the outer portion of the valve body 10 may be divided into several regions or zones, including a closed region 34, a pair of restricted flow regions 36, and a pair of free flow regions 38.

The pair of restricted flow regions 36 may be arranged in generally diametrically opposed relation to each other and parallel to the restricted flow axis 32. Each restricted flow region 36 may include a plurality of the flow control passageways 12. The flow control passageways 12 within a given restricted flow region 36 may be arranged in a series of arrays, each being aligned along a respective axis that is generally perpendicular to an equatorial circumference of the valve body 10 (e.g., the circumference that is perpendicular to the rotation axis 26). In the embodiment depicted in FIGS. 1-4, each restricted flow region includes seven arrays. From the perspective shown in FIG. 2, moving from a right to left direction, the arrays may include a first array 40 (furthest from the flow opening 14), a second array 42, a third array 44, a fourth array 46, a fifth array 48, a sixth array 50, and a seventh array 52 (closest to the flow opening 14). The first array 40 may include three (3) flow control passageways 12. The second array 42 may include seven (7) flow control passageways 12. The third array 44 may include nine (9) flow control passageways 12. The fourth array 46 may include eleven (11) flow control passageways 12. The fifth and sixth arrays 48, 50 may each include seven (7) flow control passageways 12, and the seventh array 52 may include three (3) flow control passageways 12. The increasing and then decreasing number of flow control passageways 12 in the first-seventh arrays 40-52 may allow the flow control passageways 12 to reside within a virtual circle whose diameter is equal to the diameter of the flow opening 14. As such, the arrays 40-52 may be selectively introduced or removed from the fluid flow one at a time, as will be described in more detail below.

The number of arrays 40-52 and the number of passageways 12 in each array 40-52 is provided as an example and is not intended to limit the present disclosure. In this regard, it is contemplated that the valve body 10 may include a different number of arrays 40-52, and a different number of passageways 12 within each array 40-52 without departing from the spirit and scope of the present disclosure.

The pair of free flow regions 38 may be arranged in diametrically opposed relation to each other and in coaxial alignment along the free flow axis 24. The pair of free flow regions 38 may include the inlet port 20 and outlet port 22 of the flow opening 14.

The closed region 34 may encompass the remainder of the outer portion of the valve body 10 (e.g., the portion that does not include the restricted flow regions 36 and the free flow regions 38).

Both the restricted flow axis 32 and the free flow axis 24 may reside in a common plane that is perpendicular to the rotation axis 26. Furthermore, the restricted flow axis 32 and the free flow axis 24 may intersect with each other and may be angularly offset from each other by approximately 45 degrees from each other, although other angular offsets, such as 30-60 degrees, may be defined by the restricted flow axis 32 and the free flow axis 24 without departing from the spirit and scope of the present disclosure.

In one particular embodiment, the valve body 10 may be configured such that, along the equatorial circumference, the pair of restricted flow regions 36 are positioned between the pair of free flow regions 38 and the closed region 34. Thus, again viewing from the perspective shown in FIG. 3, starting from the top, outer circumference of the valve body 10 and moving in a clockwise direction, the regions may be arranged such that a free flow region 38 is at the top, followed by a portion of the closed region 34, then a restricted flow region 36, followed by the remaining free flow region 38, another portion of the closed region 34, and finally, the remaining restricted flow region 36. The valve body 10 may be configured such that the valve body 10 is symmetrical about the equatorial circumference. As is further apparent from FIGS. 1-4, the external surface contours defined by the closed region 34 and restricted flow regions 36, and there flush or continuous relationships relative to each other, is such that the outer surface 16 of the valve body 10 collectively defined thereby has the aforementioned generally spherical shape.

When the valve body 10 is in the closed position, the closed region 34 is aligned with the fluid inlet and fluid outlet of the valve housing to prevent fluid flow through the valve housing. In the closed position, both the restricted flow region 36 and free flow regions 38 are offset from the fluid inlet and the fluid outlet.

As the valve body 10 begins to rotate from the closed position toward the open position, the first array 40 of flow control passageways 12 in one restricted flow region 36 are brought into fluid communication with the fluid inlet while the first array 40 of flow control passageways 12 in the other restricted flow region 36 are brought into fluid communication with the fluid outlet. As such, fluid may enter the flow control passageways 12 of the first array 40 on one side of the valve body 10, flow into the flow opening 14, exit the flow opening 14 through the flow control passageways 12 of the first array 40 on the other side of the valve body 10, and then exit the valve body 10 and into the fluid outlet.

As the valve body 10 continues to rotate toward the open position, the second array 42 of flow control passageways 12 in one restricted flow region 36 are brought into fluid communication with the fluid inlet while the second array 42 of flow control passageways 12 in the other restricted flow region 36 are brought into fluid communication with the fluid outlet. Thus, in this configuration, fluid may flow through both the first and second arrays 40, 42 of each of the restricted flow regions 36 (in addition to the intervening flow opening 14) to flow through the valve body 10. Thus, more fluid is capable of flowing through the valve body 10 as the valve body 10 is moved toward the open position.

The continued incremental movement of the valve body 10 toward the open position sequentially aligns the third arrays 44, then the fourth arrays 46, then the fifth arrays 48, then the sixth arrays 50, and then finally the seventh arrays 52 with the fluid inlet and fluid outlet. Arrays that have been previously aligned with the fluid inlet and the fluid outlet remain in such alignment as the valve body 10 continues toward the open position. In other words, when the seventh arrays 52 becomes aligned with the fluid inlet and the fluid outlet, the first-sixth arrays 40-50 continue to be aligned with the fluid inlet and the fluid outlet.

Continued movement of the valve body 10 toward the open position brings a portion of the flow opening 14 into alignment with both the fluid inlet and the fluid outlet, which allows fluid to flow through the flow opening 14 between the fluid inlet and the fluid outlet without passing through the passageways 12 of any of the arrays 40-52. As the flow opening 14 becomes incrementally aligned with the fluid inlet and the fluid outlet, the arrays 40-52 sequentially move out of alignment with the fluid inlet and the fluid outlet. For instance, the first array 40 may be initially moved out of alignment with the fluid inlet and the fluid outlet, followed by the second array 42, then the third array 44, and so forth, until all of the arrays 40-52 are eventually moved out of alignment with the fluid inlet and the fluid outlet. When all of the arrays 40-52 are moved out of alignment with the fluid inlet and the fluid outlet, the flow opening 14 may be completely aligned with the fluid inlet and the fluid outlet, such that all fluid flowing between the fluid inlet and the fluid outlet flows exclusively through the flow opening 14 (e.g., there is no flow between the fluid inlet and the fluid outlet that traverses completely through any of the flow control passageways 12).

Thus, initial movement of the valve body 10 from the closed position toward the open position causes a small number of flow control passageways 12 to be exposed to the fluid flow. Accordingly, the fluid pressure at initial valve opening, which is most often at the greatest pressure, is attenuated by allowing a small amount of fluid flow through the exposed flow control passageways 12. Continued movement of the valve body 10 toward the open position exposes additional flow control passageways 12 to the fluid flow, and thus, allows for a greater volume of fluid flow, and further pressure attenuation. By the time the flow opening 14 is aligned exposed to the fluid flow, the pressure may be sufficiently attenuated to allow for generally unrestricted flow fluid through the valve body 10.

Movement or rotation of the valve body 10 from the open position towards the closed position reverses the sequential alignment of the flow opening 14 and flow control passageways 12 described above. In particular, as the valve body 10 is moved toward the closed position, a portion of the flow opening 14 is moved out of alignment with the fluid flow, and the seventh array 52 is brought into alignment with the fluid flow (e.g., alignment with the fluid inlet and the fluid outlet). Thus, fluid may flow through both the flow opening 14, as well as the seventh array 52. Continued movement of the valve body 10 toward the closed position causes a greater portion of the flow opening 14 to move out of alignment with the fluid flow, and a greater number of arrays 40-52 to move into alignment with the fluid flow, until the entire flow opening 14 is moved out of alignment and all of the arrays 40-52 are moved into alignment. Additional movement toward the closed position causes the seventh array 52 to move out of alignment with the fluid flow, and a portion of the closed region 34 to move into alignment with the fluid flow. Continued movement or rotation toward the closed position sequentially moves additional arrays 40-52 out of alignment, and a greater portion of the closed region 34 into alignment until the first array 40 is the only array in alignment with the fluid flow. When the valve body 10 is moved into the fully closed position, the first array 40 is moved out of alignment with the fluid flow, and the closed region 34 is the only portion of the valve body 10 aligned with the fluid flow, which prevents fluid from flowing between the fluid inlet and the fluid outlet.

The valve body 10 may be configured to transition between the closed and open positions via rotation relative to the valve housing of approximately ninety degrees. In other words, rotation in a first rotational direction by a magnitude of approximately ninety degrees may result in transition from the closed position toward the open position, while rotation in a second rotational direction by a magnitude of approximately ninety degrees may result in transition from the open position toward the closed position.

The unique configuration of the valve body 10 may be made possible by additive manufacturing or three-dimensional printing, wherein the valve body 10 is formed in successive layers to form a unitary structure. An example of an additive manufacturing technique is direct metal laser sintering (DMLS), which is described in U.S. Pat. No. 8,826,938 entitled *Direct Metal Laser Sintered Flow Control Element*, the disclosure of which is incorporated herein by reference. Other three-dimensional printing or manufacturing techniques known in the art may also be used without departing from the spirit and scope of the present disclosure.

Although the entirety of the valve body 10 may be formed by additive manufacturing or three-dimensional printing, it is contemplated that the closed region 34 and the free flow regions 38 may be formed as a unitary, forged body and the restricted flow regions 36 may be formed as separate bodies via additive manufacturing or three-dimensional printing. The restricted flow regions 36 may be inserted into the forged body and secured therein via any one of a variety of fastening techniques known in the art. These techniques could include heat shrinking, welding, the use of mechanical fasteners or adhesives, etc.

Figure 4A:
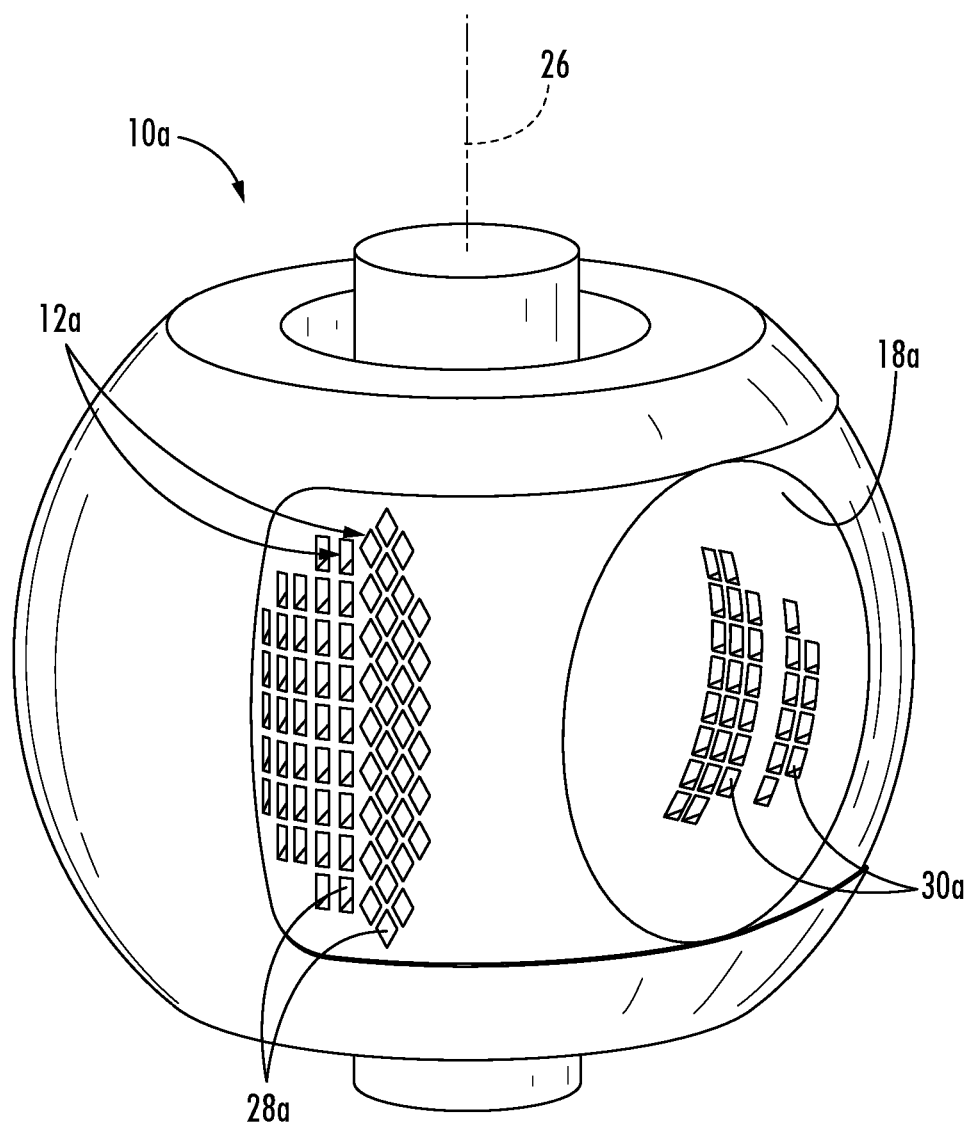
FIG. 4A is an upper perspective view of a minor variation of the valve body depicted in FIGS. 1-4, with the valve body including outer surface openings that differ in configuration.

FIG. 4A is an upper perspective view of an alternative embodiment, including valve body 10a having outer surface openings 28a that are not all of the same configuration. In particular, the valve body 10a includes a first group of outer surface openings 28a that are rectangular, with the long side of the rectangles being parallel to the rotation axis 26. The valve body 10a additionally includes a second group of outer surface openings 28a that are generally diamond shaped, with the acute angles of each diamond being aligned along an axis that is parallel to the rotation axis 26. The first and second groups of outer surface openings 28a may be arranged such that the outer surface openings 28a in one group are exposed to the fluid flow prior to the outer surface openings 28a in the other group. Thus, certain desirable flow characteristics may be associated with each opening 28a, and one configuration may be more desirable to receive fluid flow as the valve body 10a is cracked open from the closed position, while another configuration may be more desirable to receive the fluid flow as the valve body 10a moves closer toward the fully open position. The difference between the rectangular configuration and the diamond-shaped configuration is exemplary in nature only, and thus, it is contemplated that other shapes and configurations of outer surface openings 28a may be adopted. Furthermore, while the exemplary embodiment depicts two distinct groups of outer surface opening configurations, it is contemplated that any number of distinct groups of outer surface opening configurations may be implemented in the valve body 10a, e.g., three groups, four groups, etc.

The valve body 10a additionally includes a plurality of inner surface openings 30a formed on an inner surface 18a. In the exemplary embodiment, the inner surface openings 30a are all of the same configuration, e.g., are all of a rectangular configuration. As such, certain flow control passageways 12a may include an outer surface opening 28a that is of a first configuration (e.g., a diamond configuration), and an inner surface opening 30a that is of a second configuration (e.g., a rectangular configuration), while other flow control passageways 12a may include outer and inner surface openings 28a, 30a that are the same configuration. Furthermore, although the exemplary embodiment includes inner surface openings 30a that are all of the same configuration, it is contemplated that in other embodiments, the valve body 10a may include inner surface openings 30a that differ in configuration.

Figure 5:
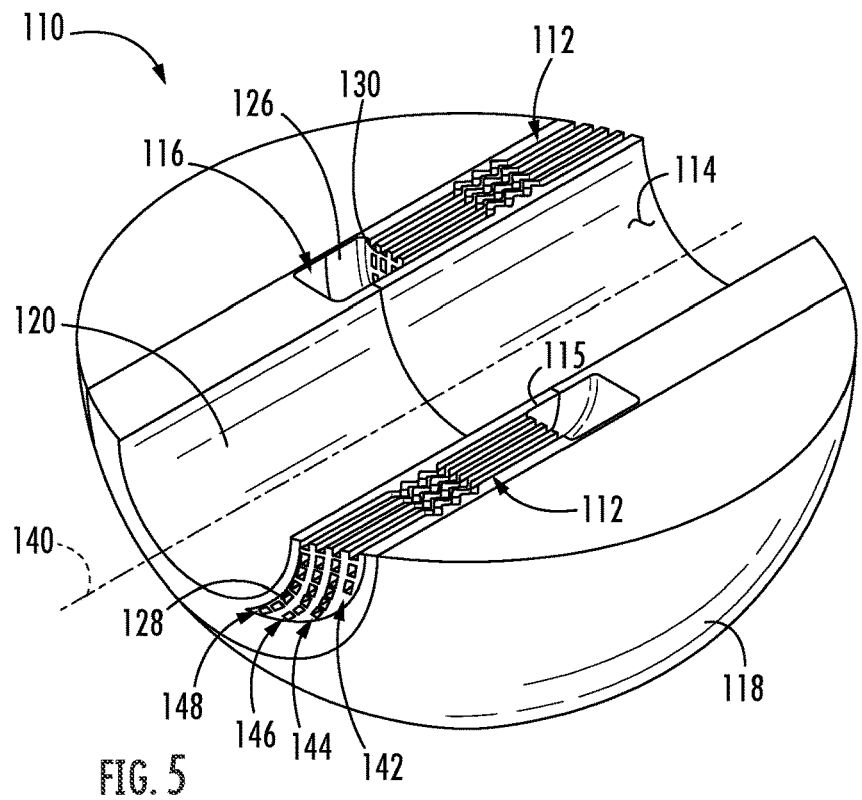
FIG. 5 is an upper perspective, cross sectional view of a second embodiment of a fluid energy dissipating valve body for integration into a flow control valve.
Figure 6:
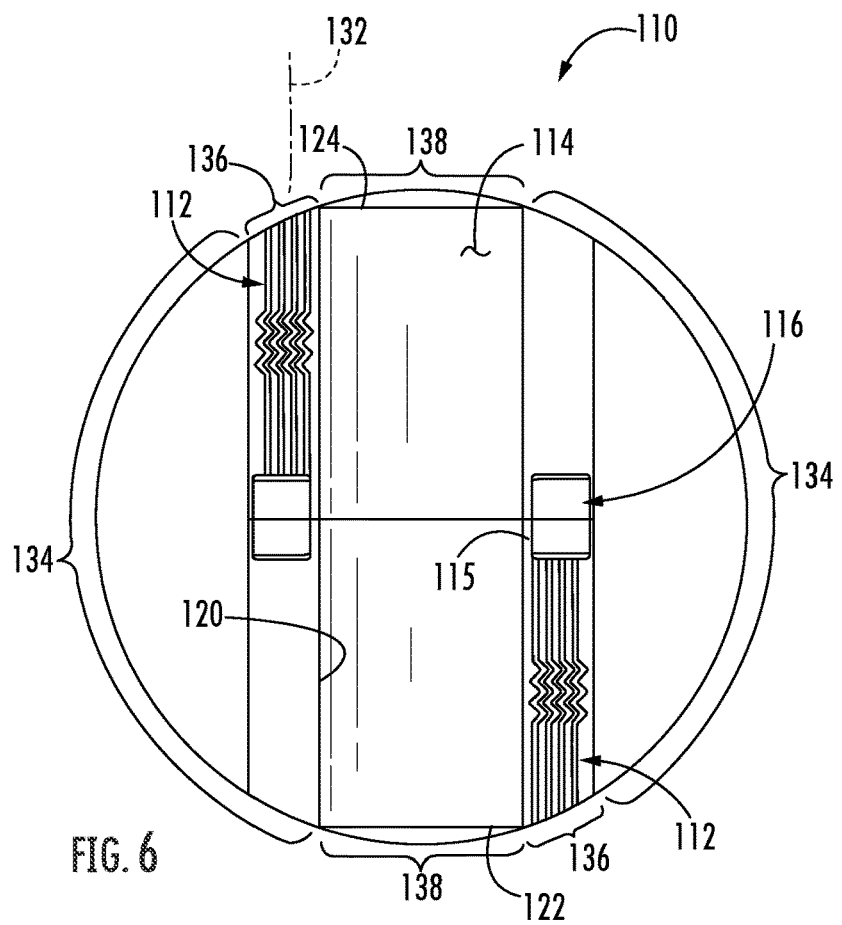
FIG. 6 is a top, cross sectional view of the valve body depicted in FIG. 5.
Figure 7:
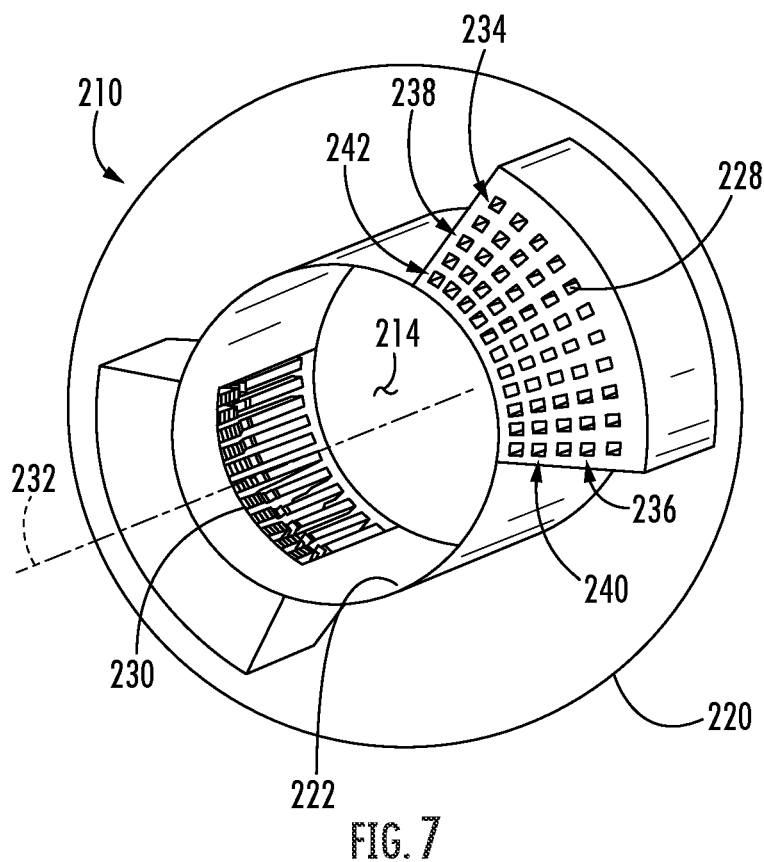
FIG. 7 is a first side upper perspective view of a third embodiment of a fluid energy dissipating valve body for integration into a flow control valve.
Figure 8:
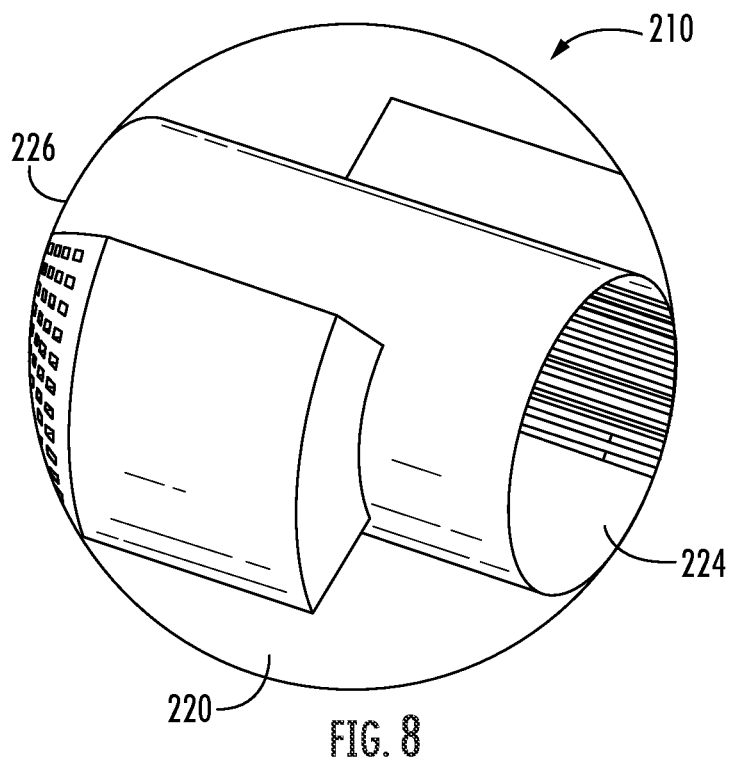
FIG. 8 is a second side upper perspective view of the valve body depicted in FIG. 7.
Figure 9:
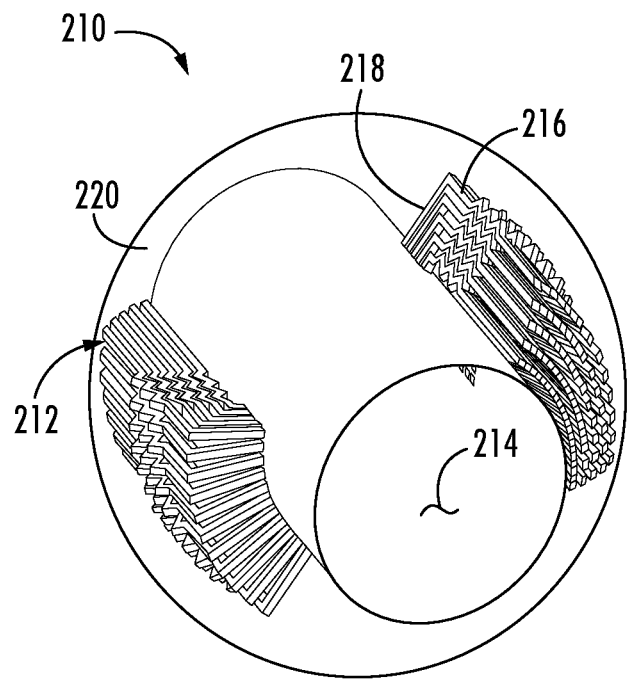
FIG. 9 is an upper perspective view of the valve body depicted in FIG. 7, with a portion of the valve body being transparent to illustrate internal flow control passageways thereof.
Figure 10:
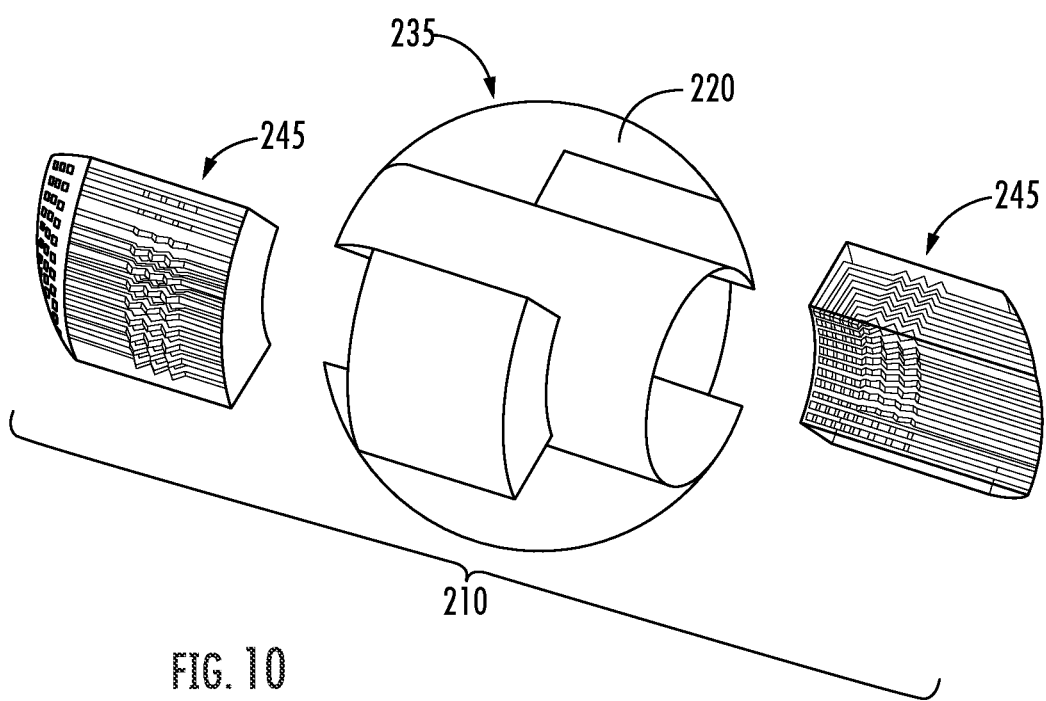
FIG. 10 is an exploded upper perspective view of the valve body depicted in FIG. 7.

Referring now to FIGS. 5-6, there is depicted a second embodiment of a valve body 110 having a plurality of flow control passageways 112 and a flow opening 114 formed therein. The flow control passageways 112 are fluidly isolated from the flow opening 114, and instead, rely on an internal plenum 116 to transfer fluid from flow control passageways 112 on one side of the valve body 110 to flow control passageways 112 on the other side of the valve body 110.

The valve body 110 includes an outer surface 118 that is generally spherical in configuration. A cylindrical inner surface 120 extends diametrically through the valve body 110 and defines the flow opening 114, which includes an inlet port 122 and an outlet port 124. The annular plenum 116 is defined by an inner plenum surface 126, with the annular plenum 116 extending around the flow opening 114. The annular plenum 116 may be slightly spaced radially outward relative to the flow opening 114 by a dividing wall 115 to fluidly separate and isolate the plenum 116 from the flow opening 114. In one embodiment, the plenum 116 forms a complete circle around (i.e., fully circumvents) the flow opening 114, while in other embodiments, the plenum 116 may only form a partial circle around (i.e., partially circumvent) the flow opening 116.

Each flow control passageway 112 includes an outer surface opening 128 at the outer surface 118 and an inner opening 130 at the inner plenum surface 126, with the inner opening 130 facilitating fluid communication between the flow control passageway 112 and the plenum 116. Each flow control passageways 112 may extend, between its respective outer surface opening 128 and inner surface opening 130, in generally parallel to what is shown and labeled in FIG. 6 as an exemplary restricted flow axis 132.

The outer portion of the valve body 110 may be divided into several regions or zones, including a closed region 134, a pair of restricted flow regions 136, and a pair of free flow regions 138.

The pair of restricted flow regions 136 may be arranged in generally diametrically opposed relation to each other. Each restricted flow region 136 may include a plurality of flow control passageways 112 that extend generally parallel to each other. The flow control passageways 112 within a given restricted flow region 136 may be arranged in a series of radial arrays, each being spaced by a different amount from the central axis 140 of the flow opening 114. In the embodiment depicted in FIGS. 5-6, each restricted flow region 136 includes four arrays. From the perspective shown in FIG. 5 (which shows only the bottom half of the valve body 110, with the upper half being a mirror image of the bottom half), moving from an outside-to-inside direction, the arrays may include a first array 142 (furthest from the flow opening 114), a second array 144, a third array 146, and a fourth array 148 (closest to the flow opening 114). The first array 142 may include five (5) flow control passageways 112 (the lower half of which are shown in FIG. 5). The second array 144 may include eleven (11) flow control passageways 112. The third and fourth arrays 146, 148 may each include thirteen (13) flow control passageways 112. The number of arrays 142-148 and the number of passageways 112 in each array 142-148 is provided as an example and is not intended to limit the present disclosure. In this regard, it is contemplated that the valve body 110 may include a different number of arrays 142-148, and a different number of passageways 112 within each array 142-148 without departing from the spirit and scope of the present disclosure.

The pair of free flow regions 138 may be arranged in diametrically opposed relation to each other and in coaxial alignment along the central axis 140 (e.g., a free flow axis), which may be parallel to the restricted flow axis 132. The pair of free flow regions 138 may include the inlet port 122 and outlet port 124 of the flow opening 114.

The closed region 134 may encompass the remainder of the outer portion of the valve body 110 (e.g., the portion that does not include the restricted flow regions 136 and the free flow regions 138).

When the valve body 110 is in the closed position, the closed region 134 is aligned with the fluid inlet and fluid outlet of the valve housing to prevent fluid flow through the valve housing. In the closed position, the restricted flow regions 136 and the free flow region 138 are offset from the fluid inlet and the fluid outlet, and thus, do not receive fluid from the fluid inlet.

As the valve body 110 begins to rotate from the closed position toward the open position, at least some of the first array 142 of flow control passageways 112 in one restricted flow region 136 are brought into fluid communication with the fluid inlet while at least some of the first array 142 of flow control passageways 112 in the other restricted flow region 136 are brought into fluid communication with the fluid outlet. In this regard, due to the radial or curved alignment of the arrays 142-148, not all of the flow passageways 112 in a given array 142-148 may become aligned with the fluid flow at the same time. Fluid may enter the aligned flow control passageways 112 of the first array 142 on one side of the valve body 110, flow into the plenum 116, exit the plenum 116 through the aligned flow control passageways 112 of the first array 142 on the other side of the valve body 110, and then exit the valve body 110 and into the fluid outlet.

As the valve body 110 continues to rotate toward the open position, more, if not all, of the first array 142 of flow control passageways 112, in addition to at least some of the second array 144 of flow control passageways 112, of one restricted flow region 136 become aligned and thus are brought into fluid communication with the fluid inlet. At the same time, more, if not all, of the first array 142 of flow control passageways 112, in addition at least some of the second array 144 of flow control passageways 112, of the other restricted flow region 136 become aligned and thus are brought into fluid communication with the fluid outlet. Thus, in this configuration, fluid may flow through at least some of both the first and second arrays 142, 144 of each of the restricted flow regions 136, which are fluidly connected via the plenum 116, to flow through the valve body 110. Thus, more fluid is capable of flowing through the valve body 110 as the valve body 110 is moved toward the open position.

The continued incremental movement or rotation of the valve body 110 toward the open position sequentially aligns the third arrays 146 and then the fourth arrays 148 with the fluid inlet and fluid outlet. Arrays that have been previously aligned with the fluid inlet and the fluid outlet remain in such alignment as the valve body 110 continues to rotate toward the open position. In other words, when the fourth arrays 148 become aligned with the fluid inlet and the fluid outlet, the first-third arrays 142-146 continue to be aligned with the fluid inlet and the fluid outlet.

Continued movement or rotation of the valve body 110 toward the open position brings a portion of the flow opening 114 into alignment with both the fluid inlet and the fluid outlet, which allows fluid to fluid through the flow opening 114 without being channeled through the restricted flow regions 136 and intervening plenum 116. As the flow opening 114 becomes incrementally aligned with the fluid inlet and the fluid outlet, the arrays 142-148 sequentially move out of alignment with the fluid inlet and the fluid outlet. For instance, at least some flow control passageways 112 in the first array 142 may be initially moved out of alignment with the fluid inlet and the fluid outlet, followed by the second array 144, then the third array 146, and finally the fourth array 148, until all of the arrays 142-148 are moved out of alignment with the fluid inlet and the fluid outlet. When all of the arrays 142-148 are moved out of alignment with the fluid inlet and the fluid outlet, the flow opening 114 may be completely aligned with the fluid inlet and the fluid outlet, such that all fluid flowing between the fluid inlet and the fluid outlet flows through only the flow opening 114.

Movement or rotation of the valve body 110 from the open position towards the closed position reverses the sequential alignment of the flow opening 114 and flow control passageways 112 described above. In particular, as the valve body 110 is moved or rotated toward the closed position, a portion of the flow opening 114 is moved out of alignment with the fluid flow, and at least some of the flow control passageways 112 in the fourth array 148 are brought into alignment with the fluid flow. Thus, fluid may flow through both the flow opening 114, as well as the fourth array 148. Continued movement or rotation of the valve body 110 toward the closed position causes a greater portion of the flow opening 114 to move out of alignment with the fluid flow, and a greater number of arrays 142-148 to move into alignment with the fluid flow, until the entire flow opening 114 is moved out of alignment and all of the arrays 142-148 are moved into alignment with the fluid flow. Additional movement or rotation toward the closed position causes the fourth array 148 to move out of alignment with the fluid flow, and a portion of the closed region 134 to move into alignment with the fluid flow. Continued movement or rotation toward the closed position sequentially moves additional arrays out of alignment, and a greater portion of the closed region 134 into alignment until the first array 142 is the only array in alignment with the fluid flow. When the valve body 110 is moved or rotated into the closed position, the first array 142 is moved out of alignment with the fluid flow, and the closed region 134 is the only portion of the valve body 110 aligned with the fluid flow, which prevents fluid from flowing between the fluid inlet and the fluid outlet.

The valve body 110 may be configured to transition between the closed and open positions via rotation of approximately ninety degrees, or less, such as 45 degrees, or 30 degrees. As described above in relation to the valve body 10, although the inlet and outlet ports 122, 124 have been labeled in FIG. 6, it is contemplated that the valve body 110 may be configured such that either one of the ports 122, 124 may serve as the inlet, while the other one of the ports 122, 124 may serve as the outlet. In other words, it is contemplated that the valve body 110, and the valve into which it is integrated, may accommodate bi-directional flow. Stated another way, the configuration of the valve body 110 is such that either end of the flow opening 114, and thus either of the restricted flow regions 136 proximate thereto, may be directed toward the fluid inlet or fluid outlet of the valve into which the valve body 110 is integrated.

The unique configuration of the valve body 110 may be made possible by additive manufacturing or three-dimensional printing, wherein the valve body 110 is formed in successive layers to form a unitary structure. Other three-dimensional printing or manufacturing techniques known in the art may also be used without departing from the spirit and scope of the present disclosure.

Although the entirety of the valve body 110 may be formed by additive manufacturing or three-dimensional printing, it is contemplated that the closed region 134 may be formed as a unitary, forged body and the free flow region 138 and the restricted flow regions 136 may be formed as separate bodies via additive manufacturing or three-dimensional printing. In the exemplary embodiment, the valve body 110 includes a pair of inserts, with each insert including a free flow region 138 and a restricted flow region 136. Each insert may be formed via additive manufacturing or three-dimensional printing. The inserts may be inserted into the forged body and secured therein via any one of a variety of fastening techniques known in the art. These techniques could include heat shrinking, welding, the use of mechanical fasteners or adhesives, etc.

Referring now to FIGS. 7-10, there is depicted a third embodiment of a valve body 210 having a plurality of flow control passageways 212 and a flow opening 214 formed therein. Note that portions of each of the valve bodies 210 depicted in FIGS. 7-10 have been depicted as being transparent, solely for purposes of illustration, to show the configuration and arrangement of the flow control passageways 212. The flow control passageways 212 may include an axial segment 216 and a radial segment 218 in communication with the flow opening 214 to facilitate fluid communication with the flow opening 214. In this regard, the flow control passageways 212 may be in direct fluid communication with the flow opening 214 via the radial segments 218.

The valve body 210 includes an outer surface 220 that is generally spherical in configuration. A cylindrical inner surface 222 extends diametrically through the valve body 210 and defines the flow opening 214, which includes an inlet port 224 and an outlet port 226.

The axial segment 216 of each flow control passageway 212 includes an outer surface opening 228 at the outer surface 220 and the radial segment 218 includes an inner surface opening 230 at the inner surface 222, with the inner surface opening 230 facilitating fluid communication between the flow control passageway 212 and the flow opening 214.

The outer portion of the valve body 210 may be divided into several regions or zones, including a closed region, a pair of restricted flow regions, and a pair of free flow regions.

The pair of restricted flow regions may be arranged in generally diametrically opposed relation to each other. Each restricted flow region may include a plurality of flow control passageways 212, which may be arranged in a series of radial arrays, each being spaced by a different amount from the central axis 232 of the flow opening 214 (e.g., the free flow axis). In the embodiment depicted in FIG. 7, each restricted flow region includes five arrays, which, moving from an outside-to-inside direction, the arrays may include a first array 234 (furthest from the flow opening 214), a second array 236, a third array 238, a fourth array 240, and a fifth array 242 (closest to the flow opening 214). Each of the arrays 234-242 includes eleven (11) flow control passageways 212. The number of arrays 234-242 and the number of passageways 212 in each array 234-242 is provided as an example, and is not intended to limit the present disclosure. In this regard, it is contemplated that the valve body 210 may include a different number of arrays 234-242, and a different number of passageways 212 within each array 234-242 without departing from the spirit and scope of the present disclosure.

The pair of free flow regions may be arranged in diametrically opposed relation to each other and in coaxial alignment along the free flow axis 232. The pair of free flow regions may include the inlet port 224 and outlet port 226 of the flow opening 214.

The closed region may encompass the remainder of the outer portion of the valve body 210 (e.g., the portion that does not include the restricted flow regions and the free flow regions).

When the valve body 210 is in the closed position, the closed region is aligned with the fluid inlet and fluid outlet of the valve housing to prevent fluid flow through the valve housing. In the closed position, the restricted flow regions and free flow regions are offset from the fluid inlet and the fluid outlet.

As the valve body 210 begins to rotate from the closed position toward the open position, at least some of the first array 234 of flow control passageways 212 in one restricted flow region are brought into fluid communication with the fluid inlet while at least some of the first array 234 of flow control passageways 212 in the other restricted flow region are brought into fluid communication with the fluid outlet. In this regard, due to the radial or curved alignment of the arrays, not all of the flow passageways 212 in a given array may become aligned with the fluid flow at the same time. Fluid may enter the aligned flow control passageways 212 of the first array 234 on one side of the valve body 210, flow through the axial segment 216, then through the radial segment 218 and enter the flow opening 214. The fluid may then exit the flow opening 214 through the aligned flow control passageways 212 of the first array 234 on the other side of the valve body 210, wherein the fluid flows through the radial segment 218 of the flow control passageways 212, and then through the axial segment 216, and then exit the valve body 210 and into the fluid outlet.

As the valve body 210 continues to rotate toward the open position, more, if not all, of the first array 234 of flow control passageways 212, in addition to at least some of the second array 236 of flow control passageways 212, of one restricted flow region become aligned and thus are brought into fluid communication with the fluid inlet. At the same time, more, if not all, of the first array 234 of flow control passageways 212, in addition at least some of the second array 236 of flow control passageways 212, of the other restricted flow region become aligned and thus are brought into fluid communication with the fluid outlet. Thus, in this configuration, fluid may flow through at least some of both the first and second arrays 234, 236 of each of the restricted flow regions to flow through the valve body 210. Thus, more fluid is capable of flowing through the valve body 210 as the valve body 210 is moved toward the open position.

The continued incremental movement or rotation of the valve body 210 toward the open position sequentially aligns the third arrays 238, then the fourth arrays 240, and then the fifth arrays 242, with the fluid inlet and fluid outlet. Arrays 234-242 that have been previously aligned with the fluid inlet and the fluid outlet remain aligned as the valve body 210 continues toward the open position. In other words, when the fifth arrays 242 becomes aligned with the fluid inlet and the fluid outlet, the first-fourth arrays 234-240 continue to be aligned with the fluid inlet and the fluid outlet.

Continued movement or rotation of the valve body 210 toward the open position brings a portion of the flow opening 214 into alignment with both the fluid inlet and the fluid outlet, which allows fluid to fluid through the flow opening 214. As the flow opening 214 becomes incrementally aligned with the fluid inlet and the fluid outlet, the arrays 234-242 sequentially move out of alignment with the fluid inlet and the fluid outlet. For instance, at least some flow control passageways 212 in the first array 234 may be initially moved out of alignment with the fluid inlet and the fluid outlet, followed by the second array 236, then the third array 238, then the fourth array 240, and then finally the fifth array 242, until all of the arrays 234-242 are moved out of alignment with the fluid inlet and the fluid outlet. When all of the arrays 234-242 are moved out of alignment with the fluid inlet and the fluid outlet, the flow opening 214 may be completely aligned with the fluid inlet and the fluid outlet, such that all fluid flowing between the fluid inlet and the fluid outlet flows through only the flow opening 214.

Movement or rotation of the valve body 210 from the open position towards the closed position reverses the sequential alignment of the flow opening 214 and flow control passageways 212 described above. In particular, as the valve body 210 is moved or rotated toward the closed position, a portion of the flow opening 218 is moved out of alignment with the fluid flow, and at least some of the flow control passageways 212 in the fifth array 242 are brought into alignment with the fluid flow. Thus, fluid may flow through both the flow opening 214, as well as the fifth array 242. Continued movement or rotation of the valve body 210 toward the closed position causes a greater portion of the flow opening 214 to move out of alignment with the fluid flow, and a greater number of arrays to move into alignment with the fluid flow, until the entire flow opening 214 is moved out of alignment and all of the arrays are moved into alignment. Additional movement or rotation toward the closed position causes the fifth array 242 to move out of alignment with the fluid flow, and a portion of the closed region to move into alignment with the fluid flow. Continued movement or rotation toward the closed position sequentially moves additional arrays out of alignment, and a greater portion of the closed region into alignment until the first array 234 is the only array in alignment with the fluid flow. When the valve body 210 is moved into the closed position, the first array 234 is moved out of alignment with the fluid flow, and the closed region is the only portion of the valve body 210 aligned with the fluid flow, which prevents fluid from flowing between the fluid inlet and the fluid outlet.

The valve body 210 may be configured to transition between the closed and open positions via rotation of approximately ninety degrees, or less, such as 45 degrees, or 30 degrees. As described above in relation to the valve bodies 10, 110, although the inlet and outlet ports 224, 226 have been labeled in FIG. 8, it is contemplated that the valve body 210 may be configured such that either one of the ports 224, 226 may serve as the inlet, while the other one of the ports 224, 226 may serve as the outlet. In other words, it is contemplated that the valve body 210, and the valve into which it is integrated, may accommodate bi-directional flow. Stated another way, the configuration of the valve body 210 is such that either end of the flow opening 214, and thus either of the restricted flow regions proximate thereto, may be directed toward the fluid inlet or fluid outlet of the valve into which the valve body 210 is integrated.

The unique configuration of the valve body 210 may be made possible by additive manufacturing or three-dimensional printing, wherein the valve body 210 is formed in successive layers to form a unitary structure. Other three-dimensional printing or manufacturing techniques known in the art may also be used without departing from the spirit and scope of the present disclosure.

Although the entirety of the valve body 210 may be formed by additive manufacturing or three-dimensional printing, it is contemplated that the closed region and the free flow regions may be formed as a unitary, forged body 235 and the restricted flow regions may be formed as separate bodies 245 via additive manufacturing or three-dimensional printing. In this regard, the unitary, forged body 235 may include pockets or recesses that accommodates or receive respective ones of the separate bodies 245. The bodies 245 may be inserted into the forged body 235 and secured therein via any one of a variety of fastening techniques known in the art. These techniques could include heat shrinking, welding, the use of mechanical fasteners or adhesives, etc.

Referring now to FIGS. 11-17, there is depicted another embodiment of a valve body 310 which comprises two cooperating pieces, each being independently moveable or rotatable within the valve housing 336 to achieve desired fluid flow characteristics. In particular, the valve body 310 includes an outer shell 312 and an inner restrictive core 314 having a plurality of flow control passageways 316 formed therein. The outer shell 312 may be rotatably moved, relative to the valve housing 336, between a closed position and an open position to sequentially expose portions of the inner restrictive core 314 to the fluid flow. In addition, the inner restrictive core 314 may itself be moveable or rotatable, relative to the valve housing 336, between a restricted position and an unrestricted position to vary the degree of alignment of the flow control passageways 316 to the fluid flow. In the restricted position, the flow control passageways 316 may be completely aligned with the fluid flow such that any fluid flow through the valve body 310 would pass through the flow control passageways 316. In the unrestricted position, the inner restrictive core 314 is rotated to move the flow control passageways 316 out of alignment with the fluid flow and to allow the fluid flow to pass relatively unrestricted through a flow-through channel, at least partially defined by the inner restrictive core 314.

Figure 11:
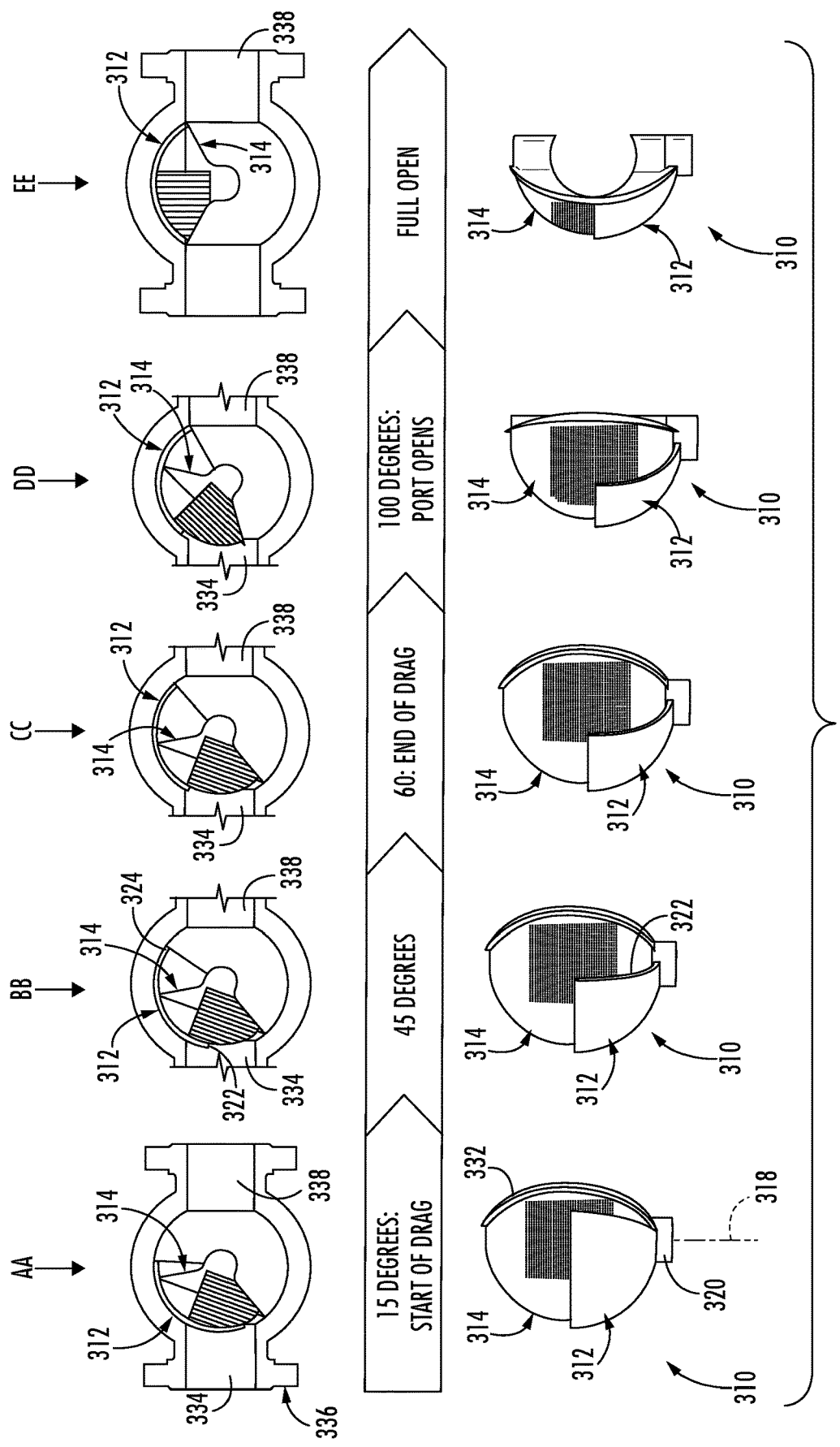
FIG. 11 is a schematic depicting exemplary sequential flow control stages of a fourth embodiment of a fluid energy dissipating valve body for integration into a flow control valve, and including an outer shell and an inner restricting core.
Figure 14:
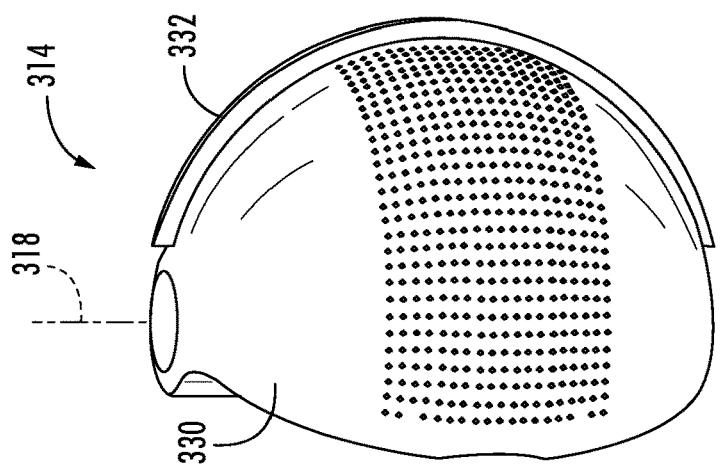
FIG. 14 is a rear, upper perspective view of the inner restricting core of FIG. 12.
Figure 13:
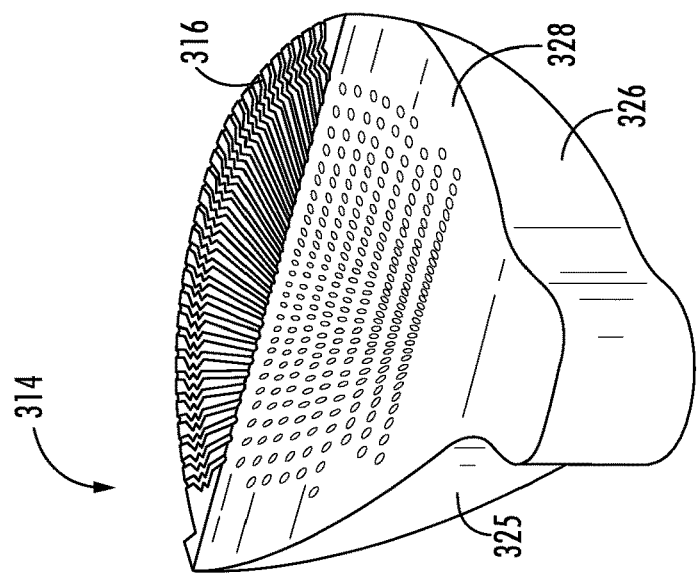
FIG. 13 is a front, upper perspective, cross sectional view of the inner restricting core of FIG. 12.
Figure 12:
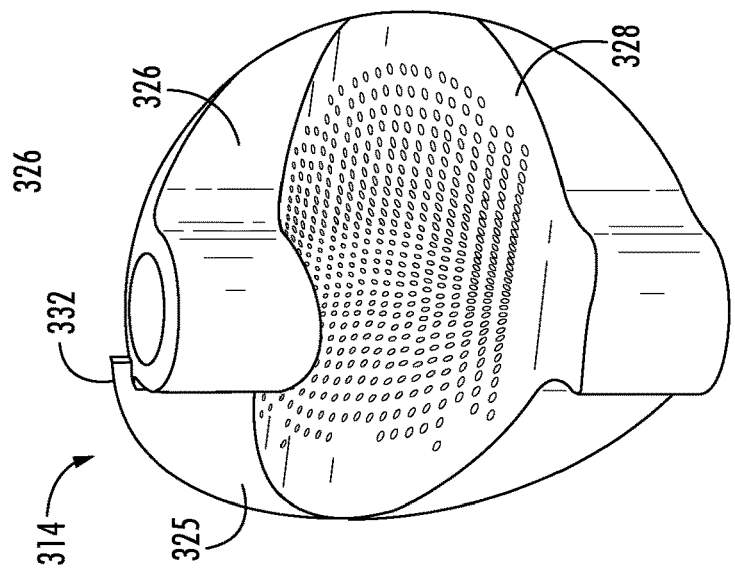
FIG. 12 is a front, upper perspective view of an inner restricting core used in the valve body depicted in FIG. 11.
Figure 15:
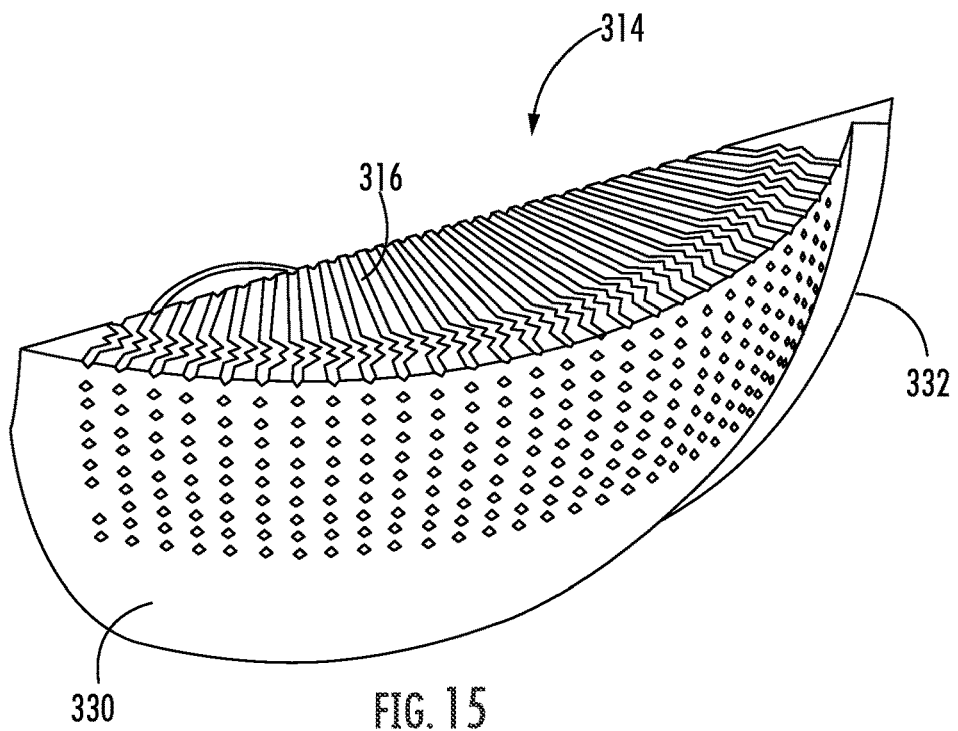
FIG. 15 is a rear, upper perspective view, cross sectional view of the inner restricting core of FIG. 12.
Figure 16:
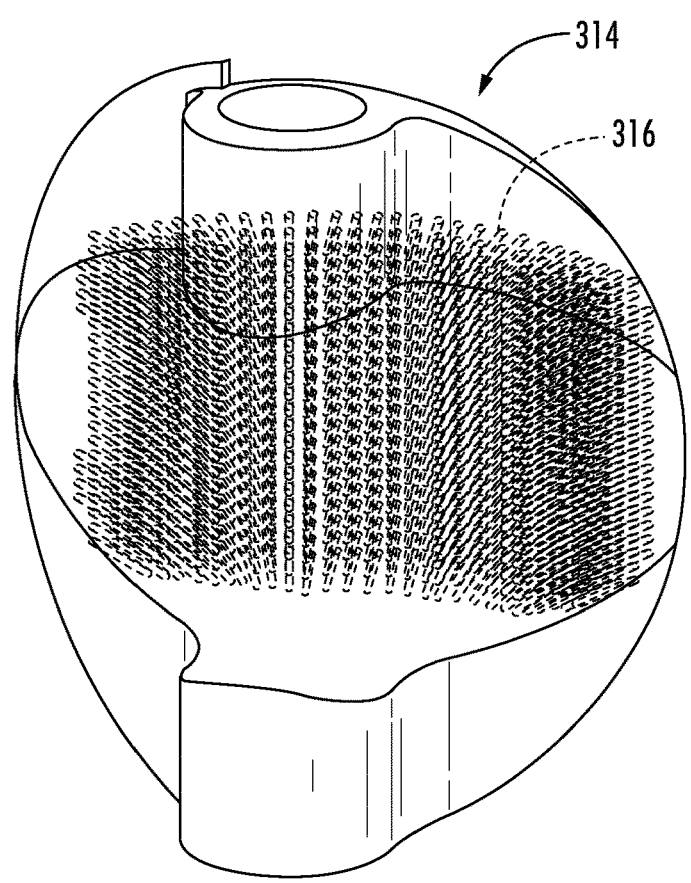
FIG. 16 is a front, upper perspective view of the inner restricting core depicted in phantom to illustrate internal flow control passageways thereof.
Figure 17:
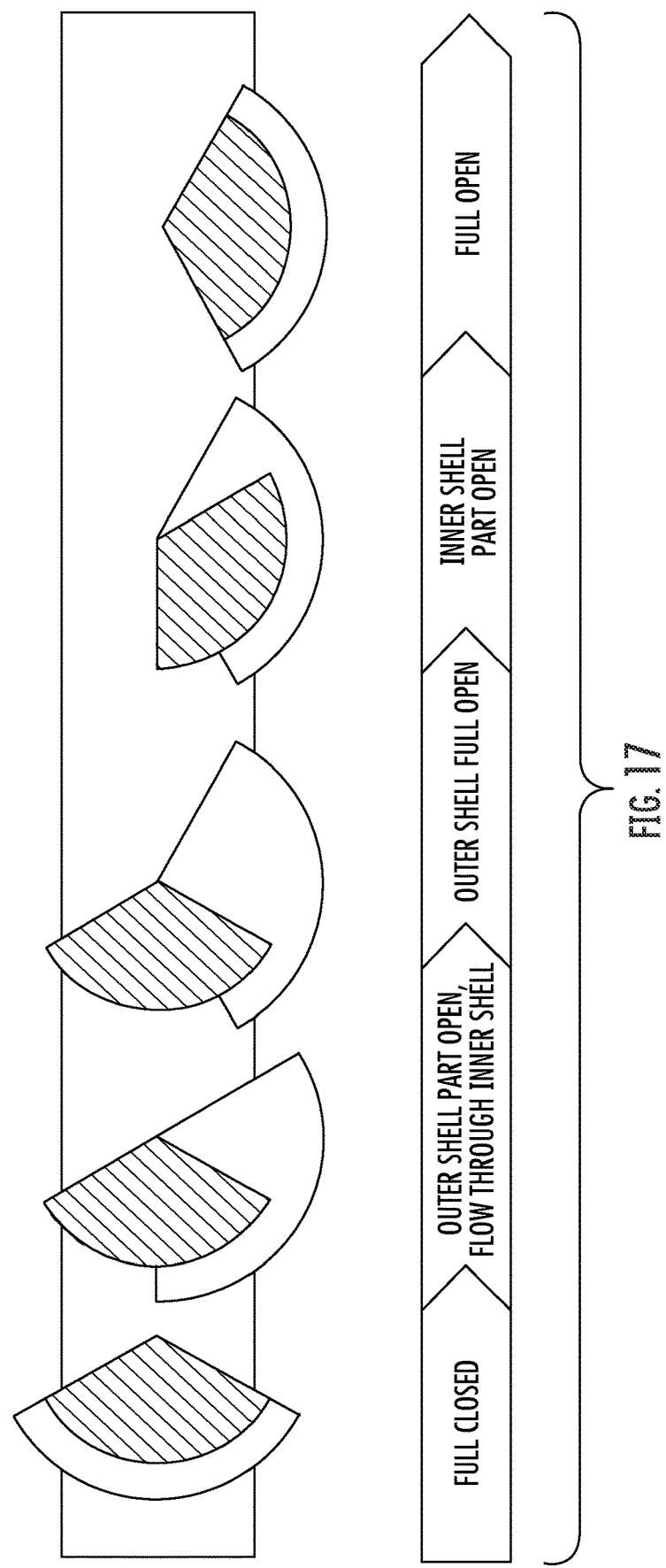
FIG. 17 is a further schematic, similar to FIG. 11, also depicting exemplary sequential flow control stages of the valve body of the fourth embodiment.
Figure 18:
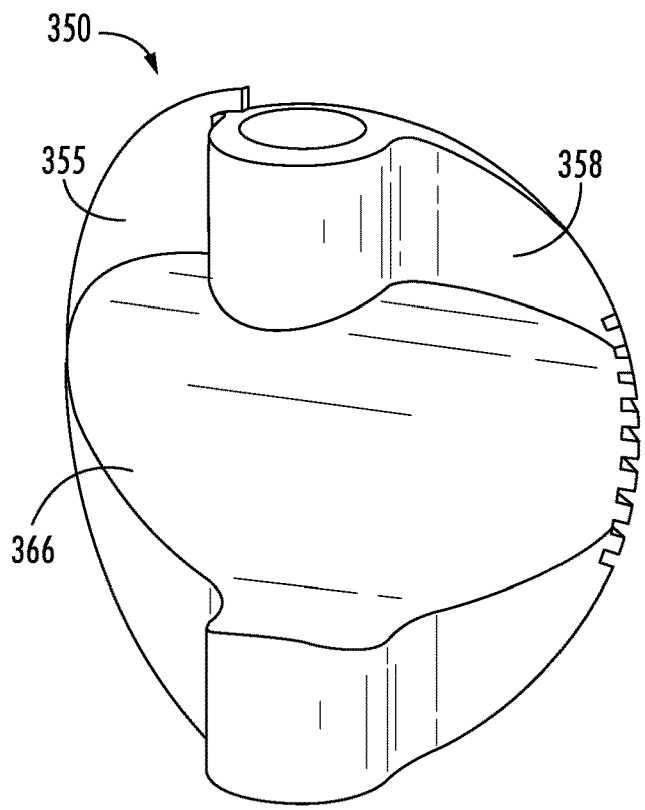
FIG. 18 is front, upper perspective view of a variant of the inner restricting core of the valve body of the fourth embodiment.
Figure 19:
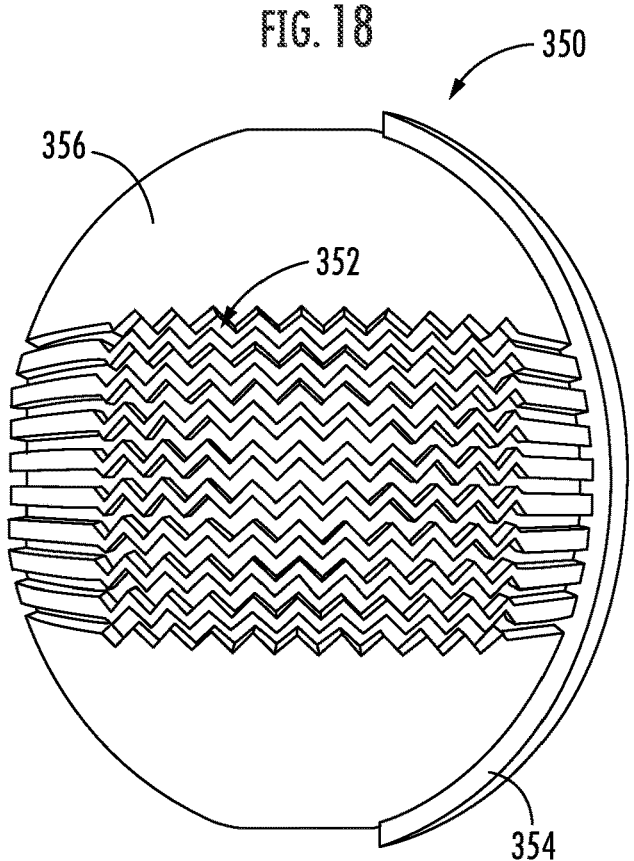
FIG. 19 is a rear view of the inner restricting core of FIG. 18.

FIG. 11 shows both the outer shell 312 and the inner restrictive core 314 in various stages of flow control, with the sequence showing, in a left-to-right direction, the valve body 310 being transitioned from its closed position to its open position. It is worth noting that in the lower row of sequential depictions of the valve body 310 in FIG. 11, the upper half of the outer shell 312 has been removed to illustrate the flow control passageways 316 of the inner restrictive core 314.

The outer shell 312 is a partially spherical body having a convex outer surface and a concave inner surface. The outer shell 312 is rotatably coupled to the valve housing to allow the outer shell 312 to rotate about a rotation axis 318 between its closed and open positions, as will be described in more detail below. In this regard, the outer shell 312 may include a rotation shaft 320 that facilitates the rotatable movement thereof.

The outer shell 312 includes a first side edge 322 and a second side edge 324, as well as an outer surface and an inner surface, both of which extend continuously between the first side edge 322 and the second side edge 324. In one embodiment, the first side edge 322 is spaced from the second side edge 324 by approximately 90 degrees, and thus, the outer shell 312 may be in the shape of approximately one-quarter of a sphere. However, other sizes and configurations of the outer shell 312 are also contemplated, such as an outer shell 312 wherein the first and second side edges 322, 324 are spaced from each other by approximately 35-145 degrees.

Referring now specifically to FIGS. 12-16, the inner restrictive core 314 includes a pair of side surfaces 325, 326, an inner concave surface 328, and an outer surface 330 that is partially spherical. The inner restrictive core 314 is sized to be nested within the outer shell 312. In more detail, the inner restrictive core 314 includes an outer surface 330 that is complementary in shape to the inner surface of the outer shell 312. In this regard, the size and radius of curvature of the outer surface 330 of the inner restrictive core 314 is similar to the size and radius of curvature of the inner surface of the outer shell 312 so as to allow for close, nested positioning of the inner restrictive core 314 relative to the outer shell 312.

The inner restrictive core 314 also includes an abutment rib 332 or flange protruding outwardly from the outer surface 330 and positioned adjacent one of the side surfaces 325. The inner restrictive core 314 is rotatably coupled to the valve housing 336 to allow the inner restrictive core 314 to rotate about the rotation axis 318 between its restricted position and unrestricted position. The portion of the inner restrictive core 314 adjacent the rotation axis 318 may be referred to as a pole, and due to the spherical nature of the inner restrictive core 314, there may be two poles or areas adjacent the rotation axis 318. The abutment rib 332 extends across the outer surface 330 in a circumferential manner with one end of the abutment rib 332 being positioned adjacent one of the poles, and the other end of the abutment rib 332 being position adjacent the other of the poles.

The inner restrictive core 314 is also includes a plurality of flow control passageways 316 formed therein, with each flow control passageway 316 extending between the inner concave surface 328 and the outer surface 330. The flow control passageways 316 may extend in a radial direction that is generally perpendicular to the tangent of the outer surface 330. However, in other embodiments the flow control passageways 316 may be oriented to extend in other configurations. For instance, the flow control passageways 316 may be oriented such that all of the passageways 316 extend in a generally parallel relationship to each other.

Referring back to FIG. 11, the movement of both the outer shell 312 and the inner restrictive core 314 associated with transitioning of the valve body 310 between the closed and open positions will now be described. Furthermore, FIG. 17 also provides a schematic depiction of the valve body 310 being transitioned between the closed and open positions, with the movement of the outer shell 312 and inner restrictive core 314 being represented by the shaded shapes, and the flow passage within the valve housing 336 being represented by the rectangular outline.

When the outer shell 312 is in its closed position, the outer shell 312 blocks fluid from flowing from the fluid inlet 334 of the valve housing 336 to the flow control passageways 316 of the inner restrictive core 314. As such, the first side edge 322 of the outer shell 312 may be in contact with the abutment rib 332 to effectively seal the inner restrictive core 314 from fluid flow.

In position AA, the inner restrictive core 314 is in its restricted position, with the outer surface 330 being aligned with the fluid inlet 334. The outer shell 312 has been moved slightly (e.g., 15 degrees) from its closed position to expose a portion of the inner restrictive core 314 to the fluid inlet 334, and thus allow fluid flow through certain ones of the flow control passageways 316. As such, the elevated pressure associated with valve opening may be attenuated by allowing a limited amount of fluid to pass through a limited number of flow control passageways 316.

In position BB, the inner restrictive core 314 remains in its restricted position, while the outer shell 312 has been moved further from its closed position (e.g., 45 degrees) to expose an even greater portion of the inner restrictive core 314 to the fluid inlet 334. Thus, more flow control passageways 316 are uncovered and can receive a greater volume of fluid from the fluid inlet 334, to allow for a greater reduction in fluid pressure.

In position CC, the inner restrictive core 314 remains in its restricted position, while the outer shell 312 has been moved to its open position (e.g., 60 degrees) to expose all of the flow control passageways 316 on the inner restrictive core 314. In this regard, all fluid flow between the fluid inlet 334 and the fluid outlet 338 is through the flow control passageways 316.

In position DD, the outer shell 312 remains in its open position, and the inner restrictive core 314 begins to transition from its restricted position toward its unrestricted position (approximately 40 degrees from the restricted position). The movement or rotation of the inner restrictive core 314 toward the unrestricted position allows some of the fluid flow from the fluid inlet 334 to the fluid outlet 338 to flow around the inner restrictive core 314, while the remaining portion of the fluid flow passes through a portion of the flow control passageways 316. In this regard, certain flow control passageways 316 may be moved out of alignment with the fluid inlet 334 and blocked by the valve housing 336 when the inner restrictive core 314 transitions from the restricted position toward the unrestricted position.

In position EE, the outer shell 312 remains in the open position, and the inner restrictive core 314 has been transitioned completely to its unrestricted position (approximately 80 degrees from the restricted position). The movement of the inner restrictive core 314 to the unrestricted position allows all fluid flow between the fluid inlet and the fluid outlet to bypass both the outer shell 312 and the inner restrictive core 314 to flow substantially uninhibited by the valve body 310. The contour of the inner concave surface 328 may be complementary to the inner contour of the fluid inlet 334 and the fluid outlet 338 to provide a substantially continuous flowpath and mitigate any undesirable disruptions or disturbances in the fluid flow. For instance, the curvature of the inner concave surface 328 maybe similar to the curvature/diameter of fluid inlet 334 and the fluid outlet 338.

Although the foregoing describes the opening of the valve body 310, closing of the valve body 310 may proceed in the opposite sequence. In particular, the inner restrictive core 314 may be moved from its unrestricted position toward its restricted position, while the outer shell 312 remains in its open position. Subsequently, the outer shell 312 may be moved from its open position toward its closed position.

The outer shell 312 and inner restrictive core 314 may move independent from one another, with such movement being one at a time (e.g., either movement of the outer shell 312 or the inner restrictive core 314) or concurrently.

Referring now to FIGS. 18-21, there is depicted an alternative embodiment of inner restrictive core 350, which includes a plurality of flow control passageways 352 that extend generally circumferentially across or about the inner restrictive core 350. This arrangement of the flow control passageways 352 is distinguishable from radially extending flow control passageways 316 described above and shown in FIGS. 11-16. In more detail, each flow control passageway 352 may extend from abutment rib 354, which resides adjacent side surface 355, across the outer surface 356 to the opposite side surface 358. In the exemplary embodiment, the flow control passageways 352 are of equal length and configuration, including a linear segment 360 adjacent the abutment rib 332, a series of bends 362, and then a linear segment 364 adjacent the side surface 358. The plurality of flow control passageways 352 extend in a latitudinal configuration relative to the axis of rotation 364.

The inner restrictive core 350 is configured for use with the outer shell 312, such that when the outer shell 312 is in its closed position, the outer shell 312 blocks fluid from flowing from the fluid inlet 334 of the valve housing 336 to the flow control passageways 352 of the inner restrictive core 350. As such, the first side edge 322 of the outer shell 312 may be in contact with the abutment rib 354 to effectively seal the inner restrictive core 350 from fluid flow.

When the inner restrictive core 350 is in its restricted position, the outer shell 312 may be moved from its closed position to expose a portion of each flow control passageway 352 adjacent the abutment rib 354. Given that at least a portion of each flow control passageway 352 may be exposed, fluid may flow through each passageway 352, between the outer shell 312 and the inner restrictive core 350. Furthermore, an effective length of the flow control passageway 352 may refer to the length along a given passageway 352 between the edge 322 of the outer shell 312 and the side edge 356 of the inner restrictive core 350. When the outer shell 312 is initially moved away from the abutment rib 354, the effective length of each flow control passageway 352 may be its greatest. As the outer shell 312 continues to move toward its open position, with the inner restrictive core 350 remaining in its restricted position, the effective length of each flow control passageway 352 decreases, as the edge 322 of the outer shell 312 is moved toward the side 358 of the of inner restrictive core 350.

While the outer shell 312 remains in its open position, the inner restrictive core 350 may begin transitioning from its restricted position toward its unrestricted position. The movement of the inner restrictive core 350 toward the unrestricted position allows some of the fluid flow from the fluid inlet 334 to the fluid outlet 338 to flow around the inner restrictive core 350, while the remaining portion of the fluid flow passes through a portion of the flow control passageways 352, until the inner restrictive core 350 reaches the unrestricted position.

With the outer shell 312 remaining in the open position, and the inner restrictive core 350 having been transitioned completely to its unrestricted position, fluid flow between the fluid inlet 334 and the fluid outlet 338 is allowed to bypass both the outer shell 312 and the inner restrictive core 350 to flow in a substantially uninhibited manner. The contour of the inner concave surface 366 may be continuous (e.g., include no openings, breaks or disruptions), and may be complementary to the inner contour of the fluid inlet 334 and the fluid outlet 338 to provide a substantially continuous flowpath and mitigate any undesirable disruptions or disturbances in the fluid flow.

Figure 24:
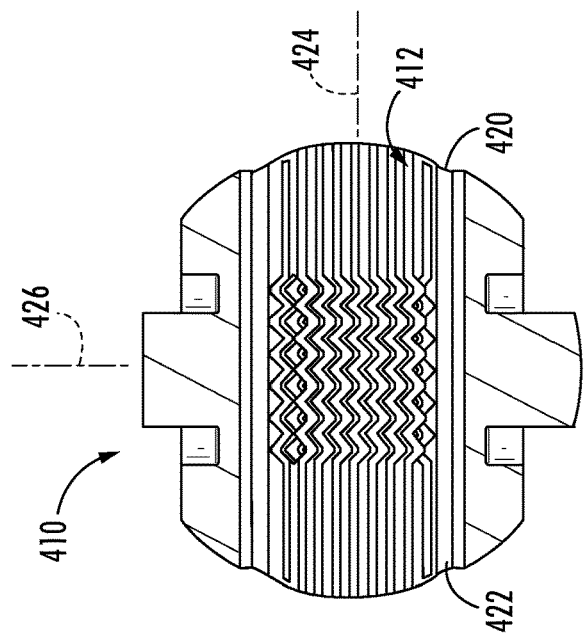
FIG. 24 is a side, cross sectional view of the valve body of FIG. 22.
Figure 23:
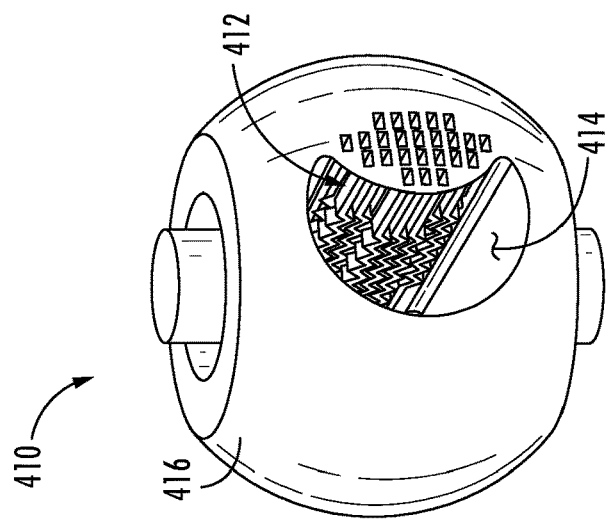
FIG. 23 is an upper perspective view of the valve body of FIG. 22.
Figure 22:
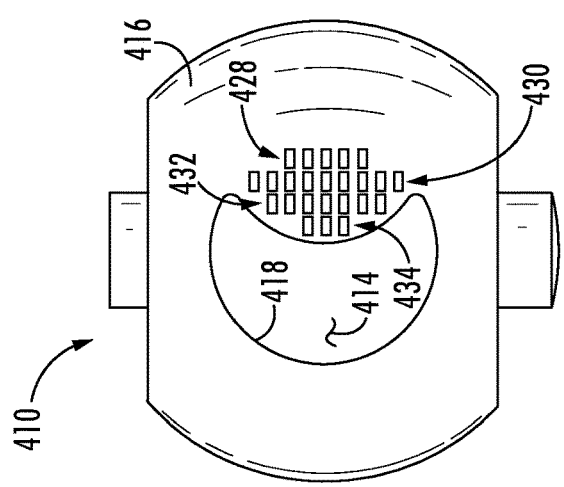
FIG. 22 is a front view of a fifth embodiment of a fluid energy dissipating valve body for integration into a flow control valve.

Referring now to FIGS. 22-24, there is depicted another embodiment of a valve body 410 which is similar to a conventional ball-type valve, having a plurality of flow control passageways 412 formed therein, along with a flow opening 414 configured to allow for unrestricted flow therethrough. Note that portions of FIGS. 23 and 24 have been depicted as being transparent, solely for purposes of illustration, to show the configuration of the internal flow control passageways 412.

The valve body 410 includes an outer surface 416 that is generally spherical in configuration. An inner surface 418 extends diametrically through the valve body 410 and defines the flow opening 414, which includes an inlet port 420 and an outlet port 422. The flow opening 414 extends along a free flow axis 424 and the valve body 410 may be configured to be rotatable within the valve housing between the closed and open positions about a rotation axis 426 that is generally perpendicular to the free flow axis 424.

Each flow control passageway 412 extends axially through the valve body 410. In the exemplary embodiment, the flow control passageways 412 extend in generally parallel relation to each other, as well as in generally parallel relation to the flow opening 414. The flow control passageways 412 are not in communication with the flow opening 414. Thus, fluid may flow completely through the flow control passageways 412 without entering or passing through the flow opening 414.

From the perspective shown in FIGS. 22 and 23, the outer surface of the valve body 410 may be divided into several regions or zones, including a closed region, a pair of restricted flow regions, and a pair of free flow regions.

The pair of restricted flow regions may include a plurality of the flow control passageways 412. The flow control passageways 412 within a given restricted flow region may be arranged in a series of arrays, each being aligned along an axis that is generally perpendicular to an equatorial circumference of the valve body (e.g., the circumference that is perpendicular to the rotation axis 426). In the embodiment depicted in FIGS. 22 and 23, each restricted flow region includes four arrays. From the perspective shown in FIG. 22, moving from a right to left direction, the arrays may include a first array 428 (furthest from the flow opening 414), a second array 430, a third array 432, and a fourth array 434 (closest to the flow opening 414). The first array 428 may include five (5) flow control passageways 412. The second array 430 may include nine (9) flow control passageways 412. The third array 432 may include seven (7) flow control passageways 412, and the fourth array 434 may include three (3) flow control passageways 412.

The pair of free flow regions may be arranged in diametrically opposed relation to each other and in coaxial alignment along the free flow axis 424. The pair of free flow regions may include the inlet port 420 and outlet port 422 of the flow opening 414.

The closed region may encompass the remainder of the outer surface of the valve body 410 (e.g., the portion that does not include the restricted flow regions and the free flow regions).

When the valve body 410 is in the closed position, the closed region is aligned with the fluid inlet and fluid outlet of the valve housing to prevent fluid flow through the valve housing. In the closed position, both the restricted flow region and free flow region are offset from the fluid inlet and the fluid outlet.

As the valve body 410 begins to rotate from the closed position toward the open position, the first array 428 of flow control passageways 412 in one restricted flow region are brought into fluid communication with the fluid inlet while the first array 428 of flow control passageways 412 in the other restricted flow region are brought into fluid communication with the fluid outlet. As such, fluid may enter the flow control passageways 412 of the first array 428 on one side of the valve body 410 and then exit the valve body 410 and into the fluid outlet.

As the valve body 410 continues to move or rotate toward the open position, the second array 430 of flow control passageways 412 in one restricted flow region are brought into fluid communication with the fluid inlet while the second array 430 of flow control passageways 412 in the other restricted flow region are brought into fluid communication with the fluid outlet. Thus, in this configuration, fluid may flow through both the first and second arrays 428, 430 of each of the restricted flow regions to flow through the valve body 410. Thus, more fluid is capable of flowing through the valve body 410 as the valve body 410 is moved toward the open position.

The continued incremental movement or rotation of the valve body 410 toward the open position sequentially aligns the third arrays 432 and then finally the fourth arrays 434 with the fluid inlet and fluid outlet.

Continued movement or rotation of the valve body 410 toward the open position brings a portion of the flow opening 414 into alignment with both the fluid inlet and the fluid outlet, which allows fluid to fluid through the flow opening 414. In the embodiment depicted in FIGS. 22-24, most, if not all, of the flow control passageways 412 reside within a virtual circle defined by the flow control opening 414. In this regard, the flow opening 414 includes a concave portion and a convex portion. However, if the radius of the concave portion were extended from the radial center of the flow opening 414, most, if not all, of the flow control passageways 412 may reside within that radius. Thus, when the valve body 410 is in the open position, with the flow opening 414 completely aligned with the fluid inlet and the fluid outlet, some, if not all, of the flow control passageways 412 may also remain aligned with the fluid inlet and the fluid outlet. Therefore, when the valve body 410 is in the open position, fluid may flow through the flow opening 414, as well as through the flow control passageways 412.

Movement or rotation of the valve body 410 from the open position towards the closed position reverses the sequential alignment of the flow opening 414 and flow control passageways 412 described above. In particular, as the valve body 410 is moved toward the closed position, the flow opening 414 is moved out of alignment with the fluid flow to a point where flow may exist only in certain ones of the flow control passageways 412. Continued movement or rotation toward the closed position sequentially moves additional arrays out of alignment, and a greater portion of the closed region into alignment until the first array 428 is the only array in alignment with the fluid flow. When the valve body 410 is moved into the closed position, the first array 428 is moved out of alignment with the fluid flow, and the closed region is the only portion of the valve body 410 aligned with the fluid flow, which prevents fluid from flowing between the fluid inlet and the fluid outlet.

The valve body 410 may be configured to transition between the closed and open positions via rotation of approximately ninety degrees. In other words, rotation in a first rotational direction by a magnitude of approximately ninety degrees may result in transition from the closed position toward the open position, while rotation in a second rotational direction by a magnitude of approximately ninety degrees may result in transition from the open position toward the closed position.

Those of ordinary skill in the art will recognize that though the outer surface of the valve body 410 is described in terms of defining the diametrically opposed restricted flow regions, the valve body 410 can nonetheless be viewed in terms including a continuous restricted flow section defined by the arrays 428-434 of the of the flow control passageways 412, with the opposed end of such restricted flow section defining respective ones of the restricted flow regions. In a similar vein, though the outer surface of the valve body 410 is also described in terms of defining the diametrically opposed unrestricted flow regions, the opposed ends of the continuous flow opening 414 can nonetheless be viewed as defining respective ones of those unrestricted flow regions. It is contemplated that the valve body 410 is best suited for integration into a valve configured for unidirectional flow, though it is also contemplated that such valve may be configured in a manner which allows for the use of the valve body 410 to accommodate bidirectional flow.

The unique configuration of the valve body 410 may be made possible by additive manufacturing or three-dimensional printing, wherein the valve body is formed in successive layers to form a unitary structure.

Figure 27:
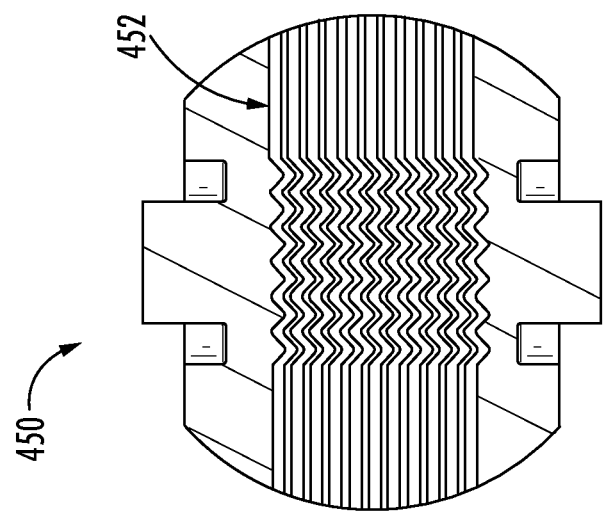
FIG. 27 is a side, cross sectional view of the valve body of FIG. 25.
Figure 26:
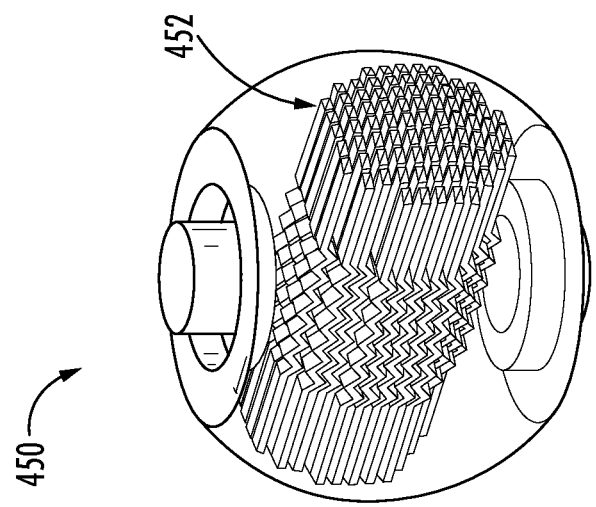
FIG. 26 is an upper perspective view of the valve body of FIG. 25, with an outer portion of the valve body being transparent to depict internal flow control passageways thereof.
Figure 25:
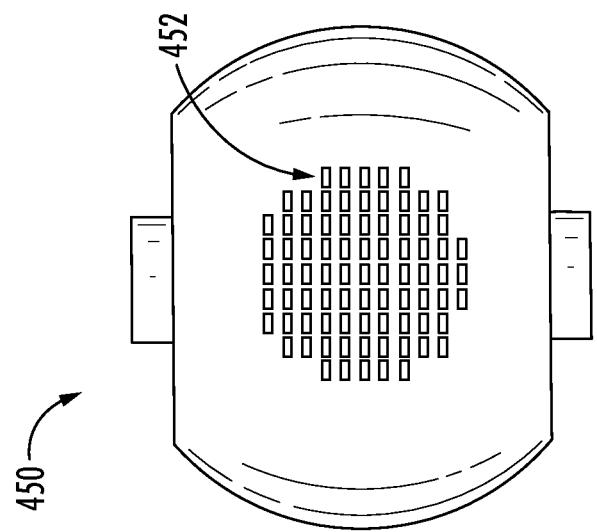
FIG. 25 is a front view of a sixth embodiment of a fluid energy dissipating valve body for integration into a flow control valve.

Referring now to FIGS. 25-27, there is depicted a valve body 450 which is a variant of the valve body 410 shown in FIGS. 22-24. In this regard, the primary distinction between the valve bodied 410, 450 lies in the absence of a flow opening, i.e., the above-described flow opening 414, in the valve body 450. Rather, the only flow path through the valve body 450 is via the flow control passageways 452. Along these lines, there may be additional flow control passageways 452 in the valve body 450, in the area that would otherwise include the flow opening 414.

It is contemplated that the valve body 450, by virtue of the inclusion of the flow control passageways 452 without an unrestricted flow opening like the flow opening 414, is best suited for integration into a valve configured for bidirectional flow, though it is also contemplated that such valve may be configured in a manner which allows for the use of the valve body 450 to accommodate unidirectional flow.

The unique configuration of the valve body 450 may be made possible by additive manufacturing or three-dimensional printing, wherein the valve body is formed in successive layers to form a unitary structure.

Additional detail regarding the use of incremental flow control through a valve including a ball-type valve body, is found in U.S. patent application Ser. No. 16/737,594, entitled *Three-Dimensional Tortuous Path Flow Element For Ball Control Valves*, the contents of which are also expressly incorporated herein by reference.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A valve body for use in a valve housing having a fluid inlet and a fluid outlet, the valve body comprising:
    an outer surface that is of a spherical configuration;
    a flow opening extending diametrically from one side of the outer surface to an opposing side of the outer surface, the flow opening being in coaxial alignment with a free flow axis;
    a plurality of flow control passageways, each flow control passageway having an outer surface opening at the outer surface and extending diametrically from one side of the outer surface to an opposing side of the outer surface, at least one of the plurality of flow control passageways having at least one segment that is of a tortuous configuration;
    the valve body being moveable relative to the valve housing between a closed position, a restricted flow position, and a free flow position;
    in the closed position, the flow opening and all of the plurality of flow control passageways are out of alignment with both the fluid inlet and the fluid outlet to prevent fluid flow therebetween;
    in the restricted flow position, at least one of the plurality of flow control passageways is moved into fluid communication with the fluid inlet and the fluid outlet to facilitate fluid communication therebetween; and
    in the free flow position, the flow opening is moved into fluid communication with the fluid inlet and the fluid outlet to facilitate fluid communication therebetween.

2. The valve body recited in claim 1, wherein at least a portion of the valve body is formed via three-dimensional printing.

3. The valve body recited in claim 1, wherein an entirety of the valve body is formed via three-dimensional printing.

4. The valve body recited in claim 1, wherein each of the plurality of flow control passageways are in fluid communication with the flow opening.

5. The valve body recited in claim 1, wherein each of the plurality of flow control passageways are fluidly isolated from the flow opening.

6. The valve body recited in claim 5, further comprising a plenum fluidly connecting a pair of the plurality of flow control passageways.

7. The valve body recited in claim 1, wherein the valve body is configured to transition from the closed position, to the restricted flow position, and to the free flow position via rotation of the valve body relative to the valve housing by a magnitude of 90 degrees or less.

8. The valve body recited in claim 1, wherein each outer surface opening is of a similar configuration.

9. The valve body recited in claim 1, wherein the at least one outer surface opening is of a first configuration and at least one outer surface opening is of a second configuration different from the first configuration.

10. The valve body recited in claim 1, wherein the outer surface openings are arranged in a plurality of arrays.

11. The valve body recited in claim 1, wherein the valve body is rotatable about a rotation axis between the closed position, the restricted flow position, and the free flow position, the flow opening extending along a flow opening axis generally perpendicular to the rotation axis.

12. A valve body for use in a valve housing having a fluid inlet and a fluid outlet, the valve body comprising:
- an outer surface that is of a spherical configuration, the outer surface including a closed region, a pair of restricted regions and a pair of free flow regions, the closed region including a continuous surface without any openings formed therein, each restricted region including a plurality of passageway openings each being in communication with an internal passageway extending diametrically from one side of the outer surface to an opposing side of the spherical outer surface, and each free flow region being in communication with a common free flow opening, at least one of the internal passageways having at least one segment that is of a tortuous configuration;
- the valve body being moveable relative to the valve housing between a closed position, a restricted flow position, and a free flow position;
- in the closed position, the closed region is in alignment with at least the fluid inlet, and the pair of restricted regions and the pair of free flow regions are out of alignment with the fluid inlet to prevent fluid flow between the fluid inlet and the fluid outlet;
- in the restricted flow position, at least a portion of each of the plurality of restricted regions is moved into fluid communication with the fluid inlet and the fluid outlet to facilitate fluid communication therebetween; and
- in the free flow position, the pair of free flow regions are moved into fluid communication with the fluid inlet and the fluid outlet to facilitate fluid communication therebetween.

13. The valve body recited in claim 12, wherein at least a portion of the valve body is formed via three-dimensional printing.

14. The valve body recited in claim 12, wherein each of the plurality of internal passageways are in fluid communication with the flow opening.

15. The valve body recited in claim 12, wherein each of the plurality of internal passageways are fluidly isolated from the flow opening.

16. The valve body recited in claim 12, wherein the valve body is configured to transition from the closed position, to the restricted flow position, and to the free flow position via rotation of the valve body relative to the valve housing by a magnitude of 90 degrees or less.

17. The valve body recited in claim 12, wherein each passageway opening is of a similar configuration.

18. The valve body recited in claim 12, wherein the at least one passageway opening is of a first configuration and at least one passageway opening is of a second configuration different from the first configuration.

19. The valve body recited in claim 12, wherein the passageway openings are arranged in a plurality of arrays.

20. The valve body recited in claim 12, wherein the valve body is rotatable about a rotation axis between the closed position, the restricted flow position, and the free flow position, the flow opening extending along a flow opening axis generally perpendicular to the rotation axis.

21. A valve body for use in a valve housing having a fluid inlet and a fluid outlet, the valve body comprising:
- an outer shell being partially spherical;
- an inner restrictive core having an outer surface;
- a flow-through channel at least partially defined by the inner restrictive core;
- a plurality of flow control passageways, each flow control passageway having an outer surface opening at the outer surface of the inner restrictive core;
- the outer shell moveable relative to the valve housing between a closed position and an open position to sequentially expose a portion of the outer surface of the inner restrictive core;
- the inner restrictive core movable relative to the valve housing between a restricted position and an unrestricted position;
- in the restricted position, a portion of the plurality of flow control passageways on said portion of the outer surface of the inner restrictive core are moved into fluid communication with the fluid inlet and fluid outlet to facilitate fluid communication therebetween;
- in the unrestricted position, the flow-through channel is moved into fluid communication with the fluid inlet and fluid outlet to facilitate fluid communication therebetween;
- wherein the outer shell and the inner restrictive core are each independently movable within the valve housing.

\* \* \* \* \*